(12) United States Patent
Mukawa et al.

(10) Patent No.: US 9,740,008 B2
(45) Date of Patent: *Aug. 22, 2017

(54) IMAGE DISPLAY DEVICE

(71) Applicant: Sony Corporation, Tokyo (JP)

(72) Inventors: Hiroshi Mukawa, Kanagawa (JP); Yoichiro Sako, Tokyo (JP); Yasushi Miyajima, Kanagawa (JP); Motoyuki Takai, Tokyo (JP); Tatsuya Narahara, Kanagawa (JP); Seiji Wada, Kanagawa (JP); Hiroaki Ogawa, Chiba (JP); Akira Tange, Tokyo (JP); Kazuhide Kemmochi, Tokyo (JP); Takao Tanikame, Kanagawa (JP); Ichigo Hayakawa, Tokyo (JP); Masashi Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 14/426,210

(22) PCT Filed: Jul. 1, 2013

(86) PCT No.: PCT/JP2013/068003
§ 371 (c)(1),
(2) Date: Mar. 5, 2015

(87) PCT Pub. No.: WO2014/041872
PCT Pub. Date: Mar. 20, 2014

(65) Prior Publication Data
US 2015/0219897 A1    Aug. 6, 2015

(30) Foreign Application Priority Data
Sep. 12, 2012   (JP) ................................. 2012-200903

(51) Int. Cl.
*G09G 5/00* (2006.01)
*G02B 27/01* (2006.01)
(Continued)

(52) U.S. Cl.
CPC ........... *G02B 27/0172* (2013.01); *G02B 5/30* (2013.01); *G02B 5/32* (2013.01); *G02F 1/0136* (2013.01);
(Continued)

(58) Field of Classification Search
CPC ................ G09G 5/10; G09G 2360/144; G06F 3/012–3/015; G02B 27/0172
(Continued)

(56) References Cited

U.S. PATENT DOCUMENTS 5,076,664 A * 12/1991 Migozzi ................. G02B 23/10
359/630
5,515,471 A *  5/1996 Yamamoto ............ G02F 1/3775
359/328

(Continued)

FOREIGN PATENT DOCUMENTS

JP          5-328257 A    12/1993
JP      HEI05328257 A    12/1993
(Continued)

OTHER PUBLICATIONS

International Search Report from International Publication No. PCT/JP2013/068003 mailed Jul. 30, 2013.

*Primary Examiner* — Prabodh M Dharia
(74) *Attorney, Agent, or Firm* — Chip Law Group

(57) ABSTRACT

There is provided an image display device used by being mounted to a head or a face of a user, the image display device including a display device configured to display an image, a waveguide configured to guide the image to each of a location seen from a side of the user and a location seen (Continued)

from an outside of the image display device, and a control unit configured to control display of an internal image and an external image, the internal image being seen from the side of the user, the external image being seen from the outside.

19 Claims, 28 Drawing Sheets

(51) Int. Cl.
    *G02F 1/1334* (2006.01)
    *G02F 1/13363* (2006.01)
    *G02B 5/30* (2006.01)
    *G02B 5/32* (2006.01)
    *G02F 1/01* (2006.01)
    *H04N 5/64* (2006.01)

(52) U.S. Cl.
    CPC ........ *G02F 1/1334* (2013.01); *G02F 1/13363* (2013.01); *H04N 5/64* (2013.01)

(58) Field of Classification Search
    USPC ............. 345/1.1–9, 156–184, 419, 427, 545; 359/462, 630, 633; 715/788; 348/47
    See application file for complete search history.

(56) References Cited

U.S. PATENT DOCUMENTS

| | | | |
|---|---|---|---|
| 5,932,342 A | 8/1999 | Zeira et al. | |
| 5,991,085 A * | 11/1999 | Rallison | G02B 27/017 345/8 |
| 6,163,390 A | 12/2000 | Kanda et al. | |
| 6,198,523 B1 | 3/2001 | Helbing | |
| 6,198,554 B1 | 3/2001 | Kanda et al. | |
| 6,304,303 B1 * | 10/2001 | Yamanaka | G02B 5/3016 349/13 |
| 6,687,029 B2 * | 2/2004 | Amanai | G02B 17/08 345/8 |
| 7,932,875 B2 * | 4/2011 | Dallas | G02F 1/133553 345/204 |
| 8,446,675 B1 * | 5/2013 | Wang | G02B 27/0172 359/630 |
| 8,508,851 B2 * | 8/2013 | Miao | G02B 27/283 345/8 |
| 8,743,464 B1 * | 6/2014 | Amirparviz | G02B 27/01 359/633 |
| 8,861,090 B2 | 10/2014 | Mukawa | |
| 8,994,611 B2 * | 3/2015 | Sugihara | G02B 27/0172 345/8 |
| 2001/0001579 A1 | 5/2001 | Kanda et al. | |
| 2002/0097457 A1 | 7/2002 | Kanda et al. | |
| 2003/0197933 A1 * | 10/2003 | Sudo | H04N 13/021 359/464 |
| 2004/0125044 A1 * | 7/2004 | Suzuki | G06F 3/011 345/1.1 |
| 2006/0176242 A1 * | 8/2006 | Jaramaz | A61B 5/0059 345/7 |
| 2008/0151379 A1 * | 6/2008 | Amitai | G02B 27/0172 359/630 |
| 2009/0213038 A1 * | 8/2009 | Huang | G02B 27/017 345/8 |
| 2010/0002154 A1 * | 1/2010 | Hua | G02B 13/00 349/11 |
| 2010/0079356 A1 * | 4/2010 | Hoellwarth | G02B 27/017 345/8 |
| 2011/0122500 A1 * | 5/2011 | Kobayashi | G02B 27/0172 359/633 |
| 2012/0154277 A1 * | 6/2012 | Bar-Zeev | G02B 27/017 345/158 |
| 2012/0162549 A1 * | 6/2012 | Gao | G02B 27/0172 349/11 |
| 2012/0169725 A1 | 7/2012 | Shimizu et al. | |
| 2013/0201293 A1 * | 8/2013 | Konno | H04N 13/0239 348/47 |
| 2013/0250207 A1 * | 9/2013 | Bohn | G02B 6/00 349/61 |
| 2013/0335302 A1 * | 12/2013 | Crane | H04N 5/2354 345/8 |
| 2014/0334010 A1 | 11/2014 | Mukawa | |
| 2015/0128035 A1 * | 5/2015 | Takae | G06F 17/30274 715/702 |
| 2015/0168731 A1 * | 6/2015 | Robbins | G02B 5/30 345/8 |
| 2015/0253573 A1 * | 9/2015 | Sako | G02B 27/0172 345/156 |
| 2016/0167672 A1 * | 6/2016 | Krueger | A61M 21/00 340/576 |

FOREIGN PATENT DOCUMENTS

| | | |
|---|---|---|
| JP | 09-197554 A | 7/1997 |
| JP | HEI09197554 A | 7/1997 |
| JP | 10-274704 A | 10/1998 |
| JP | HEI10274704 A | 10/1998 |
| JP | 2000-075815 A | 3/2000 |
| JP | 200075815 A | 3/2000 |
| JP | 2007-156096 A | 6/2007 |
| JP | 2007156096 A | 6/2007 |
| JP | 2007-251331 A | 9/2007 |
| JP | 2007251331 A | 9/2007 |
| JP | 2008-203726 A | 9/2008 |
| JP | 2008203726 A | 9/2008 |
| JP | 2011-075954 A | 4/2011 |
| JP | 2011075954 A | 4/2011 |
| JP | 2012-042654 A | 3/2012 |
| JP | 2012042654 A | 3/2012 |
| JP | 2012-141461 A | 7/2012 |
| JP | 2012141461 A | 7/2012 |

* cited by examiner

HEAD-MOUNTED IMAGE DISPLAY DEVICE 1

FIG. 26

|  | CONCENTRATION, ATTENTION | | DROWSINESS | | SLEEP |
| --- | --- | --- | --- | --- | --- |
|  | HIGH | LOW | LOW | HIGH | |
| NUMBER OF BLINKS PER UNIT TIME | FEW | MANY |  |  | NONE |
| BLINK TIME | SMALL | | | LARGE | |

FIG. 27

|  | CONCENTRATION, ATTENTION | | DROWSINESS | | SLEEP |
| --- | --- | --- | --- | --- | --- |
|  | HIGH | LOW | LOW | HIGH | |
| BLINK INTERVAL ti | SMALL | LARGE |  |  | MAXIMUM |
| BLINK TIME tb | SMALL | | | LARGE | |

FIG. 28

|  | CONCENTRATION, ATTENTION | | DROWSINESS | | SLEEP |
| --- | --- | --- | --- | --- | --- |
|  | HIGH | LOW | LOW | HIGH | |
| BLINK INTERVAL ti | SMALL | LARGE |  |  | MAXIMUM |
| BLINK TIME tb | SMALL | | | LARGE | MAXIMUM |

FIG. 29
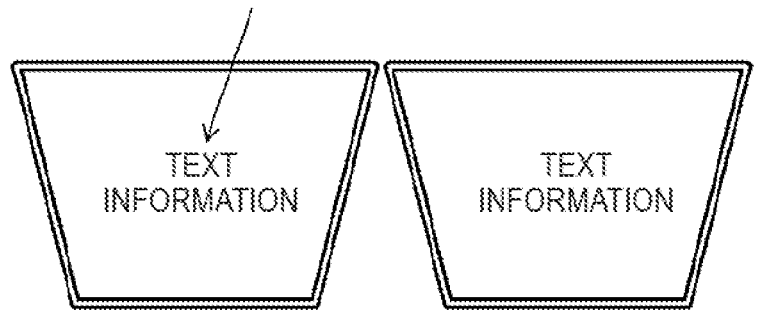
TEXT INFORMATION 29101 IN EXTERNAL IMAGE
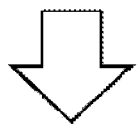
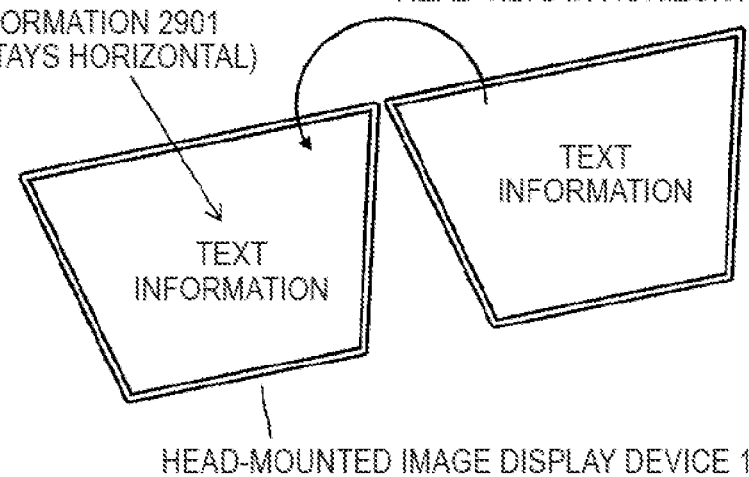
TEXT INFORMATION 2901
(DISPLAY STAYS HORIZONTAL)
HEAD TILTS IN HORIZONTAL DIRECTION
HEAD-MOUNTED IMAGE DISPLAY DEVICE 1

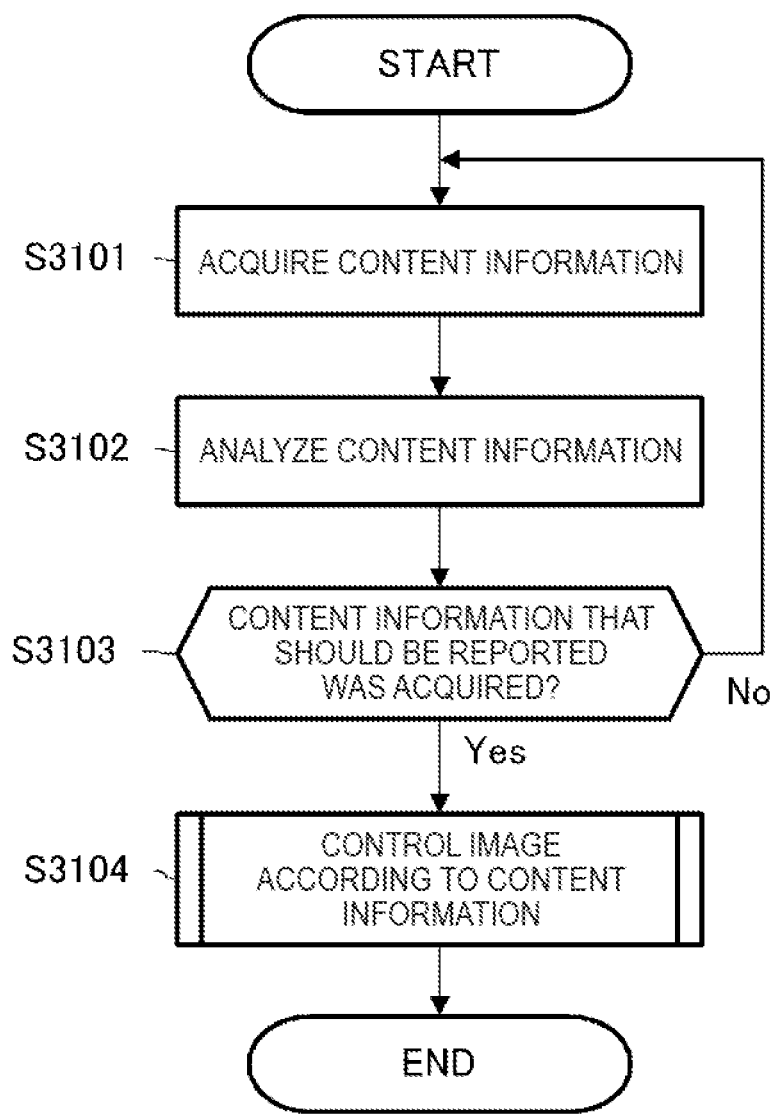

IMAGE DISPLAY DEVICE

CROSS-REFERENCE TO RELATED APPLICATION

The present application is a national phase entry under 35 U.S.C. §371 of International Application No. PCT/JP2013/068003 filed Jul. 1, 2013, published on Mar. 20, 2014 as WO 2014/041872 A1, which claims priority from Japanese Patent Application No. JP 2012-200903 filed in the Japanese Patent Office on Sep. 12, 2012.

TECHNICAL FIELD

The technology disclosed in the present description relates to an image display device that enables a viewer to view a display image as an enlarged virtual image with a virtual image optical system, and more particularly, relates to an image display device of a transmissive type that enables a viewer to look at the outside surroundings past the image even while an image is being displayed.

BACKGROUND ART

Head-mounted image display devices that are worn on the head and used to view images, or in other words, head-mounted displays, are known. A head-mounted image display device has an image display unit for each of the left and right eyes, in general, and by combining these with headphones, the head-mounted image display device is configured to enable control of visual perception and auditory perception. In addition, a head-mounted image display device is also capable of showing different images to the left and right eyes, and if an image with parallax between the left and right eyes is displayed, a three-dimensional image may be presented.

For the display unit for the left and right eyes, the head-mounted image display device is equipped with a high-resolution display panel made of liquid crystals or organic electroluminescence (EL) elements, for example. Head-mounted image display devices may be categorized into opaque and transmissive types. An opaque head-mounted display device is configured to directly cover the user's eyes when mounted on the head, and increases immersion during image viewing. A suitable angle of view is set with an optical lens that projects a display screen. In addition, if multichannel audio is reproduced with headphones, it is possible to recreate the sense of being in a movie theater (for example, see Patent Literature 1). On the other hand, in the case of a head-mounted image display device of the transmissive type, it is possible to look at the outside surroundings past the image (that is, see through the image) even while the user is wearing the device on his or her head and an image is being displayed (for example, see Patent Literature 2). For this reason, the user is able to avoid dangers such as collisions with obstacles while using the device outdoors or while walking.

Meanwhile, with regard to flat-panel display devices, there is proposed a display device capable of displaying an image on both the front and back sides (for example, see Patent Literature 3 and 4). A double-sided display device may display the same content on both sides, or display separate content on both sides. Since the user may view an image both the front side and the back side of the device housing, a double-sided display device can be a good information providing tool.

On the other hand, the head-mounted image display device discussed above may display an image on the front side, that is, facing the eyes of the wearer, but does not display an image on the back side, that is, outward from the image display device. For this reason, people on the outside are completely unable to check what the wearer is seeing. Also, since the wearer's eyes are covered, it is difficult for people on the outside to grasp the status of the wearer (for example, whether it is alright to speak now or wait until later).

It can be argued that a head-mounted image display device is an ultimate personal display. However, people other than user him- or herself who is wearing the device are unable to know the status of the user, what the user is doing, what the user is viewing, or the degree to which the user is concentrating on or immersed in viewing. Furthermore, in some cases the user him- or herself may want to announce his or her own status, inform others of the content being viewed, or communicate useful information related to the content, but to do this the user must first remove the device, and viewing is interrupted.

SUMMARY OF INVENTION

Technical Problem

An objective of the technology disclosed in the present description is to provide an excellent image display device which is worn on the head and used to view an image, and which enables various information to be presented to people on the outside, such as what the wearer is seeing and the current status of the wearer.

Solution to Problem

The present application takes the above-described problems into consideration, and provides an image display device used by being mounted to a head or a face of a user, the image display device including a display device configured to display an image, a waveguide configured to guide the image to each of a location seen from a side of the user and a location seen from an outside of the image display device, and a control unit configured to control display of an internal image and an external image, the internal image being seen from the side of the user, the external image being seen from the outside.

According to the present application, the waveguide of the image display device includes a first wave plate that converts a polarization property of emitted light of the display device, a polarization beam splitter that is disposed on an optical axis of incident light of the display device and reflects or transmits the incident light in accordance with a polarization property, a second wave plate that converts and transmits a polarization property of transmitted light of the polarization beam splitter, and a mirror that reflects transmitted light of the second wave plate. In addition, the internal image is configured to be displayed with light reflecting off the polarization beam splitter among the incident light of the display device, and the external image is configured to be displayed with the transmitted light of the polarization beam splitter, the transmitted light reflecting off the polarization beam splitter via the second wave plate and the mirror.

According to the present application, the display device of the image display device is configured to emit display light made of an s-polarized light component, the first wave plate is configured to include a half-wave plate, and to convert the emitted light of the display device into s-polarized light or p-polarized light, the polarization beam splitter is configured to be disposed with being tilted 45 degrees with respect to the optical axis of incident light from the display device, to reflect an s-polarized light component of transmitted light of the first wave plate, to display the internal image at the location seen from the side of the user, and to transmit a p-polarized light component of the transmitted light of the first wave plate, the second wave plate is configured to include a quarter-wave plate, the mirror is configured to include a concave mirror, the p-polarized light component transmitted through the polarization beam splitter is configured to be transmitted through the quarter-wave plate and converted into circularly polarized light, and the p-polarized light component transmitted through the polarization beam splitter is configured to, after being condensed and reflected by the concave mirror, be transmitted through the quarter-wave plate in an inverse direction, to be converted into s-polarized light and to reflect off the polarization beam splitter to display the external image at the location seen from the outside of the image display device.

According to the present application, an optical axis direction of the half-wave plate of the image display device is dynamically polarizable. In addition, the control unit is configured to cause the display device to keep the internal image on in synchronization with a first interval in which an optical axis orientation of the half-wave plate is set to 0 degrees, and to cause the display device to keep the external image on in synchronization with a second interval in which the optical axis orientation of the half-wave plate is set to 45 degrees.

According to the present application, the control unit of the image display device is configured to adjust luminance of each of the internal image and the external image by changing a ratio between the first interval and the second interval.

According to of the present application, the control unit of the image display device is configured to adjust luminance of the internal image by changing a time for which the display device keeps the internal image on in the first interval, or to adjust luminance of the external image by changing a time for which the display device keeps the external image on in the second interval.

According to the technology of the present application, an optical axis direction of the half-wave plate of the image display device is dynamically polarizable. In addition, the control unit is configured to control luminance of emitted light from the display device by adjusting an optical axis orientation of the half-wave plate between 0 to 45 degrees, the emitted light being displayed as the internal image and the external image.

According to the present application, the half-wave plate of the image display device includes an optical doubler made of ferroelectric crystal.

According to the present application, the image display device according to claim 2 sets a reflectance of the polarization beam splitter to a reflectance of 90% or greater.

According to the present application, the image display device according to claim 1, further includes a screen on which the external image is projected.

According to the present application, in the image display device, the screen has a size of 2 inches or less, or the screen has a gain of two or greater.

According to the present application, the image display device uses the screen including polymer dispersed liquid crystal. In addition, the control unit is configured to control a scattering effect of the screen in synchronization with a display period of the internal image or the external image.

According to the present application, the image display device uses the screen including a hologram. In addition, the control unit is configured to cause the display device to emit display light having a specific wavelength component when the external image is displayed, the display light being diffracted by the hologram.

According to the technology of the present application, the waveguide of the image display device includes a half-silvered mirror that is disposed on an optical axis of incident light of the display device, a collimating optical unit that forms reflected light of the half-silvered mirror, a concave mirror that reflects transmitted light of the half-silvered mirror, and a screen on which light that further reflects off the half-silvered mirror after reflecting off the concave mirror is projected.

According to the present application, the waveguide of the image display device includes a half-silvered mirror that is disposed on an optical axis of incident light of the display device, a collimating optical unit that forms reflected light of the half-silvered mirror, a plane mirror that reflects transmitted light of the half-silvered mirror, and a projection optical unit and a screen for projecting light that further reflects off the half-silvered mirror after reflecting off the plane mirror.

According to the present application, the image display device further includes a projection optical unit configured to project the external image to the outside.

According to the present application, the image display device further includes an input operating unit with which the user conducts an input operation. In addition, the control unit is configured to control display of the internal image and the external image in accordance with the input operation by the user.

According to the present application, the image display device further includes an environmental information acquisition unit configured to acquire information related to a surrounding environment of the image display device. In addition, the control unit is configured to control display of the internal image and the external image on the basis of the surrounding environment.

According to the present application, the image display device further includes a status information acquisition unit configured to acquire information related to a status of the user. In addition, the control unit is configured to control display of the internal image and the external image on the basis of the status of the user.

According to of the present application, the image display device further includes a content information acquisition unit configured to acquire content information related to image content to be displayed as the internal image. In addition, the control unit is configured to control display of the external image in accordance with the content information.

Advantageous Effects of Invention

According to the technology disclosed in the present description, it is possible to provide an excellent image display device which is worn on the head and used to view an image, and which enables various information to be presented to nearby people, such as what the wearer is seeing and the current status of the wearer.

A head-mounted image display device according to the technology disclosed in the present description is equipped with an internal display unit seen from the side of the wearing user as well as an external display unit seen from the outside, and is able to provide various information externally by displaying, on the external display unit, information such as the same image as what the wearer is seeing, or the status of the wearer.

Further objectives, features, and advantages of the technology disclosed in the present description will be clarified by a more detailed description based on the exemplary embodiments discussed hereinafter and the attached drawings.

BRIEF DESCRIPTION OF DRAWINGS

FIG. 26 is a diagram exemplifying a method of determining the mental status (alert/drowsy/concentrating) of the user according to a number of blinks per unit time and a blink time detected with an oculo-electric technique.

FIG. 27 is a diagram exemplifying a method of determining the mental status (alert/drowsy/concentrating) of the user according to a blink interval and a blink time detected with an oculo-electric technique.

FIG. 28 is a diagram exemplifying a method of determining the mental status (alert/drowsy/concentrating) of the user according to a blink interval and a blink time detected with an image capture technique.

FIG. 29 is a diagram illustrating how text information 2901 being displayed in an external image is controlled to stay horizontal.

FIG. 31 is a flowchart illustrating exemplary operation of the head-mounted image display device 1 or 3 according to content information.

DESCRIPTION OF EMBODIMENTS

Hereinafter, an embodiment of the present invention will be described in detail and with reference to the drawings.

As discussed earlier, head-mounted image display devices may be categorized into an opaque type (for example, see Patent Literature 1), and a transmissive type (for example, see Patent Literature 2). The technology disclosed in the present description can also be applied to the latter type.

A. Device Configuration

Figure 1:
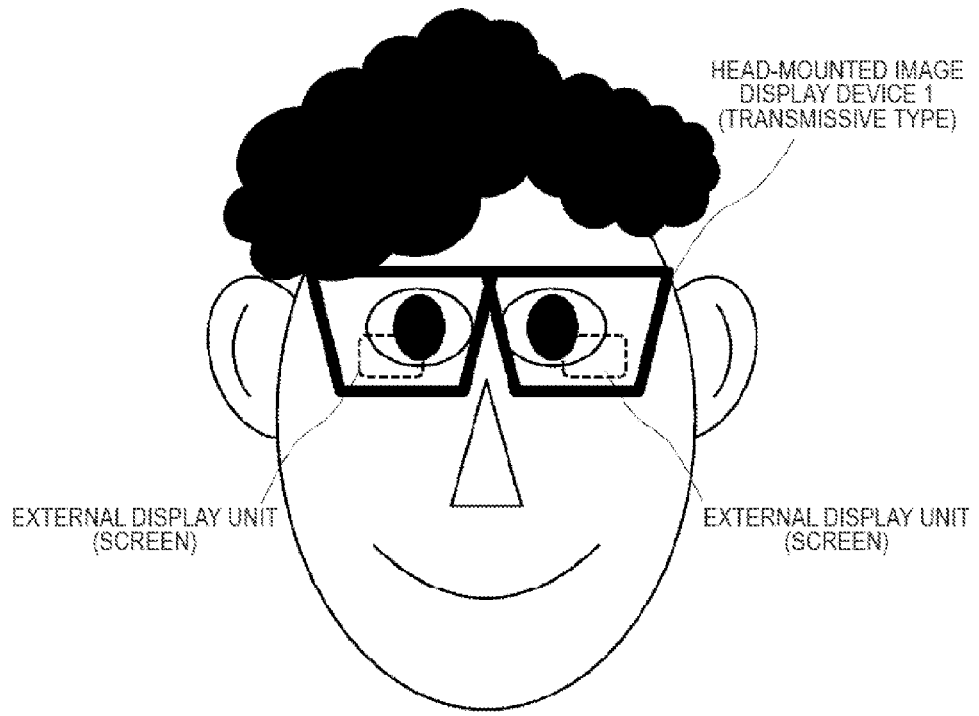
FIG. 1 is a diagram illustrating the frontal appearance of a user wearing a head-mounted image display device 3 of the transmissive type.

FIG. 1 illustrates the frontal appearance of a user wearing a head-mounted image display device 1 of the transmissive type, or in other words, see-through type.

In the example illustrated in FIG. 1, the head-mounted image display device 1 has a structure resembling eyeglasses for vision correction. The side of the head-mounted image display device 1 housing that faces the user's face is defined as "internal", while the opposite side is defined "external".

While the user wears the head-mounted image display device 1, the internal face is viewable by the user only, whereas the other external face is exposed to the outside and may also be viewed by people on the outside. Virtual image optical units made of a transparent light guide unit or the like are disposed at positions on the device 1 housing that face the user's left and right eyes, and an image that the user views is displayed internally from the virtual image optical units. In addition, an external image viewable by people on the outside is displayed externally from the virtual image optical units. The virtual image optical units are supported by a support shaped like an eyeglasses frame, for example.

Figure 2:
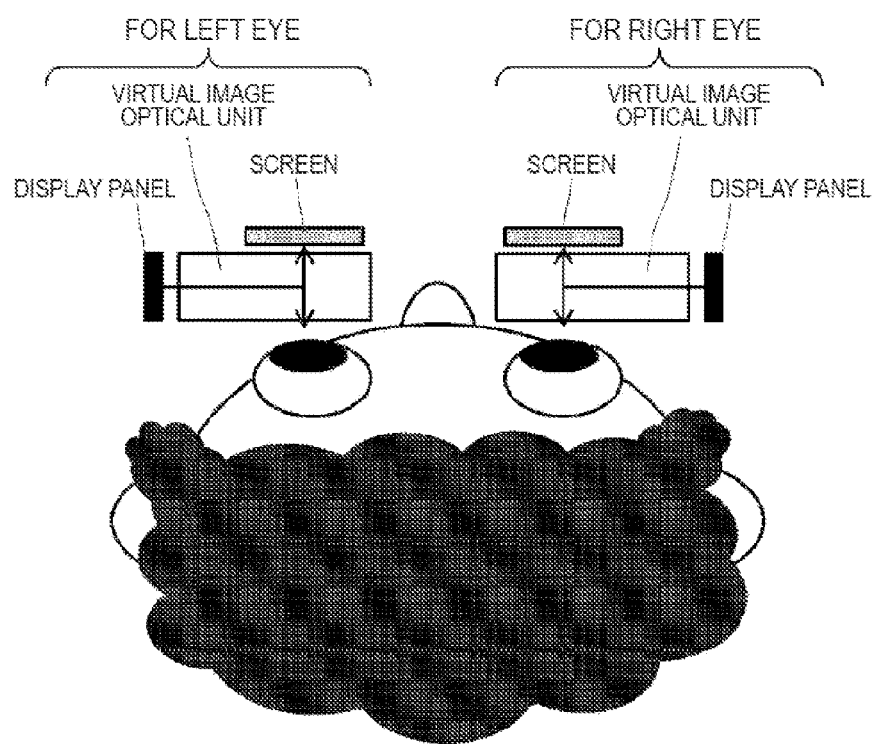
FIG. 2 is a diagram illustrating the overhead appearance of a head-mounted image display device 1 of the transmissive type.

FIG. 2 illustrates the overhead appearance of the head-mounted image display device 1. As illustrated in the drawing, display panels that respectively output a left-eye image and a right-eye image are disposed on the left and right ends of the head-mounted image display device 1. The display panels are each made of a micro-display such as a liquid crystal display or an organic EL element, and respectively displays the frames of a left-eye and right-eye internal image and external image multiplexed by time division, for example. The left and right display images are guided to the vicinity of each of the left and right eyes by the virtual image optical units, and are also separated into an internal image and an external image. Subsequently, an enlarged virtual image of the internal image is formed on the user's pupils, while an enlarged virtual image of the external image is formed on screens disposed externally from the virtual image optical units. Note that a detailed description of the configuration by which the virtual image optical units guide the output images of the display panels, separate the internal image and the external image, and form enlarged virtual images will be deferred until later.

In the head-mounted image display device 1 of the example illustrated in FIGS. 1 and 2, the display regions of the external image are disposed at positions in a front-and-back relationship with the display regions of the internal image, but the external image may also be displayed in other locations. Also, although the head-mounted image display device 3 displays the external image at a pair of left and right locations, the external image may also be displayed at a single location or at three or more locations.

Note that, although omitted from illustration in FIGS. 1 and 2, the head-mounted image display device 1 is equipped with an audio output unit that outputs audio accompanying an image. Also, the head-mounted image display device 1 is equipped with a mounting unit that mounts the relevant device 1 to the user's head or face. For example, the relevant device 3 is worn on the head by placing temple units (not illustrated), which are rotatably supported on each of the left and right ends of the device 3 housing forming a shape resembling an eyeglasses frame, on the user's left and right ears. Also, although the head-mounted image display device 3 illustrated in FIGS. 1 and 2 is a binocular type equipped with display units for both the left and right eyes, the head-mounted image display device 3 may also be configured as a monocular type equipped with a display unit for only one of the left or the right.

Figure 3:
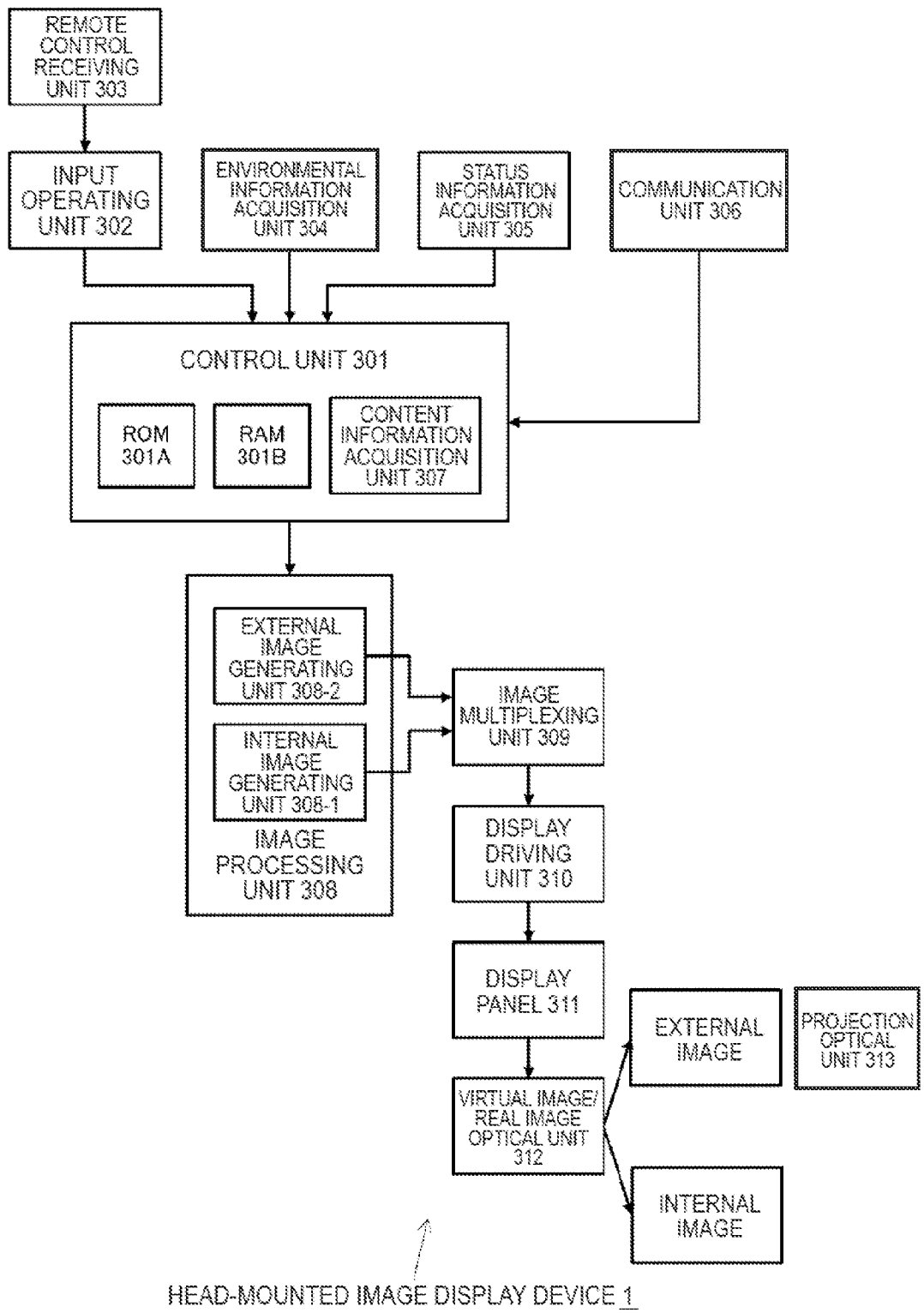
FIG. 3 is a diagram schematically illustrating a functional configuration of the head-mounted image display device 1 of the transmissive type illustrated in FIGS. 1 and 2.

FIG. 3 schematically illustrates a functional configuration of the head-mounted image display device 1 of the transmissive type illustrated in FIGS. 1 and 2. As discussed earlier, the head-mounted image display device 1 is equipped with functions for respectively displaying an internal image seen from the side of the user wearing the relevant device 1, and an external image viewed from the outside of the relevant device. Hereinafter, the respective components will be described.

The control unit 301 is equipped with read-only memory (ROM) 301A and random access memory (RAM) 301B. The ROM 301A stores program code executed by the control unit 301, and various data. The control unit 301, by executing a program loaded into the RAM 301B, controls the display of an internal image seen from the side of the user wearing the relevant device 1 and an external image seen from the outside, as well as centrally controlling the operation of the relevant device 1 overall. The data stored in the ROM 301A may include device identification information that identifies the relevant device 1, and other information unique to the device.

The input operating unit 302 is equipped with one or more operating elements on which the user performs an input operation, such as keys, buttons, and switches, receives user instructions via the operating elements, and outputs to the control unit 501. Also, the input operating unit 302 similarly receives user instructions made up of remote control commands received by the remote control receiving unit 303, and outputs to the control unit 301. Furthermore, the input operating unit 302 may also be configured to accept user instructions via eye movements or blink operations obtained from a status sensor (discussed later) such as a myoelectric sensor or an oculo-electric sensor.

In the present embodiment, the control unit 301 controls display operation for displaying an internal image seen from the side of the user wearing the relevant device 1 and an external image seen from the outside of the relevant device, in response to an instruction from the user via the input operating unit 302. For example, in response to an instruction from the user, the control unit 301 controls the turning on/off of the external image, the display method (such as the size, brightness, contrast, color tint, display position, and continuous display or intermittent display of the display image), and the information to display. In addition, the control unit 301 controls an external image linked or associated with the content displayed as the internal image in response to an instruction from the user.

The environmental information acquisition unit 304 acquires information related to the environment outside the head-mounted image display device 1, and outputs to the control unit 301. The environmental information acquisition unit 304 acquires information such as environmental light intensity, acoustic intensity, position or location, temperature, weather, time, an ambient image, and the number of people outside as the environmental information, for example. In addition, in order to acquire this environmental information, the environmental information acquisition unit 304 may also be equipped with various environmental sensors such as a light sensor, a microphone, a Global Positioning System (GPS) sensor, a temperature sensor, a humidity sensor, a clock, an image sensor (camera), and a radiation sensor (none illustrated in FIG. 3). Environmental information acquired from these environmental sensors is temporarily stored in the RAM 301B, for example.

In the present embodiment, the control unit 301 controls display operation for displaying an internal image seen from the side of the user wearing the relevant device 1 and an external image seen from the outside of the relevant device according to environmental information acquired by the environmental information acquisition unit 304. For example, according to environmental information, the control unit 301 controls the turning on/off of the external image, the display method (such as the size, brightness, contrast, color tint, display position, and continuous display or intermittent display of the display image), and the information to display. In addition, the control unit 301 controls an external image linked or associated with the content displayed as the internal image according to environmental information.

The status information acquisition unit 305 acquires information related to the status of the viewer wearing the head-mounted image display device 1, and outputs to the control unit 301. For the status information, the status information acquisition unit 305 acquires the user's work status (whether or not the user is wearing the device), the user's action status (the orientation of the wearing user's head, movement such as walking, and the open/closed state of the eyelids), mental status (indicating whether or not the user is immersed in or concentrating on viewing an internal image (or watching in the background as a distraction), such as excitement level, alertness level, or feelings and emotions), as well as the physiological status, for example. In addition, in order to acquire this status information from the user, the status information acquisition unit 305 may also be equipped with various status sensors such as a wear sensor made up of a mechanical switch and the like, a gyro sensor, an acceleration sensor, a velocity sensor, a pressure sensor, a body temperature sensor, a sweat sensor, a myoelectric sensor, an oculo-electric sensor, and a brain wave sensor (none illustrated in FIG. 3). Status information acquired from these status sensors is temporarily stored in the RAM 301B, for example.

In the present embodiment, the control unit 301 controls display operation for displaying an internal image seen from the side of the user wearing the relevant device 1 and an external image seen from the outside of the relevant device according to status information about the user's current status acquired by the status information acquisition unit 305. For example, according to user status information, the control unit 301 controls the turning on/off of the external image, the display method (such as the size, brightness, contrast, color tint, display position, and continuous display or intermittent display of the display image), and the information to display (the display of an icon expressing how much the eyes are open or the gaze direction, or text information). In addition, the control unit 301 controls an external image linked or associated with the content displayed as the internal image according to user status information.

The communication unit 306 conducts a communication process with another device, as well as modulation/demodulation and coding/decoding processes on communication signals. For example, the communication unit 306 receives an image signal to be displayed as an internal image from external equipment (not illustrated) that acts as an image source. Obviously, the communication unit 306 may receive from the external equipment an external image that differs from the internal image.

An internal image or external image that has been received, demodulated, and decoded by the communication unit 306 or other received data is supplied to the control unit 301. Also, the control unit 301 transmits transmission data to external equipment from the communication unit 306.

The configuration of the communication unit 306 is arbitrary. For example, the communication unit 306 may be configured according to a communication standard used for transmitting and receiving operations with external equipment that acts as a communication peer. The communication standard may be either wired or wireless. The communication standard referred to herein may be a standard such as Mobile High-Definition Link (MHL), Universal Serial Bus (USB), High-Definition Multimedia Interface (HDMI; registered trademark), Bluetooth (registered trademark) communication, or infrared communication.

The content information acquisition unit 307 acquires information of image content input via the communication unit 306. In the example illustrated in the drawings, the content information acquisition unit 307 is realized by a program executed in the control unit 301, but the content information acquisition unit 307 may also be configured as dedicated hardware outside the control unit 301. The content information acquisition unit 307 acquires content information such as, for example, metadata accompanying image content (such as the title, genre, and detailed information about the content, and the Uniform Resource Locator (URL) of a related site), the total playback time of the image content, the current playback position or the remaining playback time, and parental controls or other usage restriction flags. In addition, the content information acquisition unit 307 is equipped with a decoder that decodes data such as text embedded in the main coded image content.

In the present embodiment, the control unit 301 controls display operation for displaying an internal image seen from the side of the user wearing the relevant device 1 and an external image seen from the outside of the relevant device according to content information acquired by the content information acquisition unit 307. For example, according to content information, the control unit 301 controls the turning on/off of the external image, the display method (such as the size, brightness, contrast, color tint, display position, and continuous display or intermittent display of the display image), and the information to display (such as a text string such as a URL that provides detailed information or related information about the content, or a QR code (registered trademark) that encodes a text string). In addition, the control unit 301 controls an external image linked or associated with the content displayed as the internal image according to content information.

The image processing unit 308 includes an internal image generating unit 308-1 that generates an internal image on the basis of an image signal output from the control unit 301, and an external image generating unit 308-2 that generates an external image on the basis of an image signal output from the control unit 301. The image processing unit 508 additionally conducts signal processing such as image quality correction on the generated internal image and external image, as well as conversion to a resolution suited to the screen of the display panel 611. However, in the case of externally displaying the same image as the internal image, the external image generating unit 308-2 is omitted.

Figure 4:
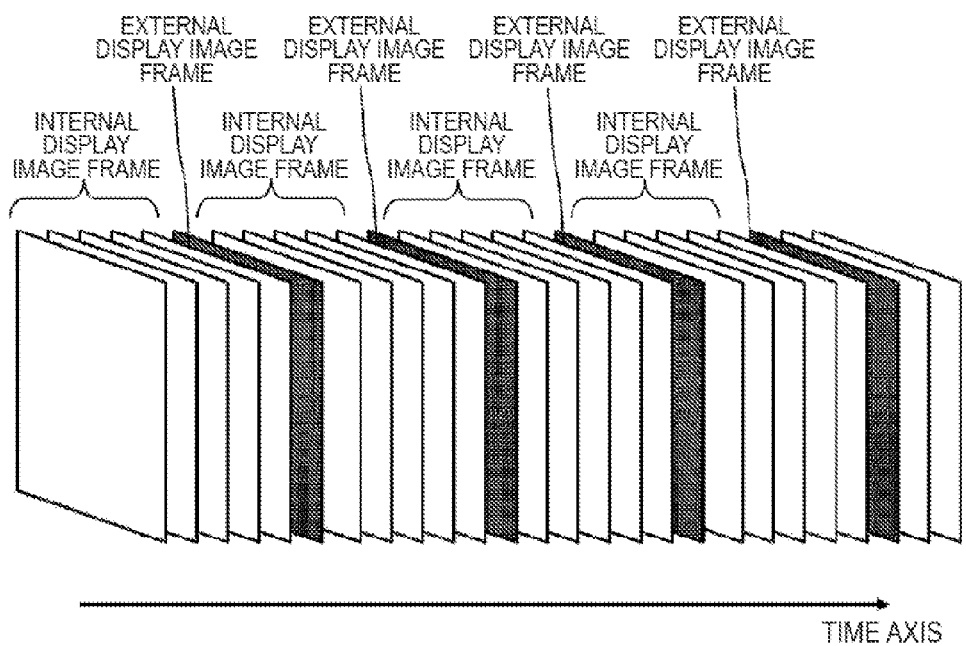
FIG. 4 is a diagram illustrating the display interval of an internal image and an external image.

The image multiplexing unit 309 multiplexes frames of the internal image and the external image respectively generated by the internal image generating unit 308-1 and the external image generating unit 308-2 for display by a single display panel 311. The multiplexing method is arbitrary, but the following will describe time-division multiplexing. For example, as illustrated in FIG. 4, the image multiplexing unit 309 inserts 1 external image frame for every N consecutive internal image frames on the time axis. The luminance ratio (or image definition) of the internal image and the external image in this case simply becomes N:1 (assuming that the luminance of each of the internal image and the external image at the time of output is the same). Herein, N is a positive integer equal to or greater than 1 (in the example illustrated in the drawing, N=4). As the value of N becomes larger, the external image that is ultimately displayed becomes a brighter, more well-defined image. However, in the case of externally displaying the same image as the internal image, the multiplexing process by the image multiplexing unit 309 is omitted.

As an image display system, the head-mounted image display device 1 of the transmissive, or in other words, see-through type is equipped with a display panel 311 that display a multiplexed internal image and external image, and a virtual image/real image optical unit 312 that accepts display light displayed by the display panel 311, separates the internal image and the external image, and guides an enlarged virtual image of the internal image to the viewer's pupils while guiding a real image of the external image to the outside.

The display panel 311 is made up of a micro-display such as an organic electroluminescence (EL) display, an inorganic EL display, or a liquid crystal display (LCD), for example. The following description supposes that a liquid crystal display that outputs image light made up of linearly-polarized light is implemented as the display panel 311. In addition, the display driving unit 310 sequentially selects the pixels of the display panel 311 every row and performs line-sequential scanning to supply a pixel signal based on the processed image signal.

The virtual image/real image optical unit 312 separates the multiplexed internal image and external image with an optical effect, for example, and forms a virtual image enlarging the internal image on the user's pupils while also forming a real image of the external image on an externally disposed screen (see FIG. 2).

Figure 5:
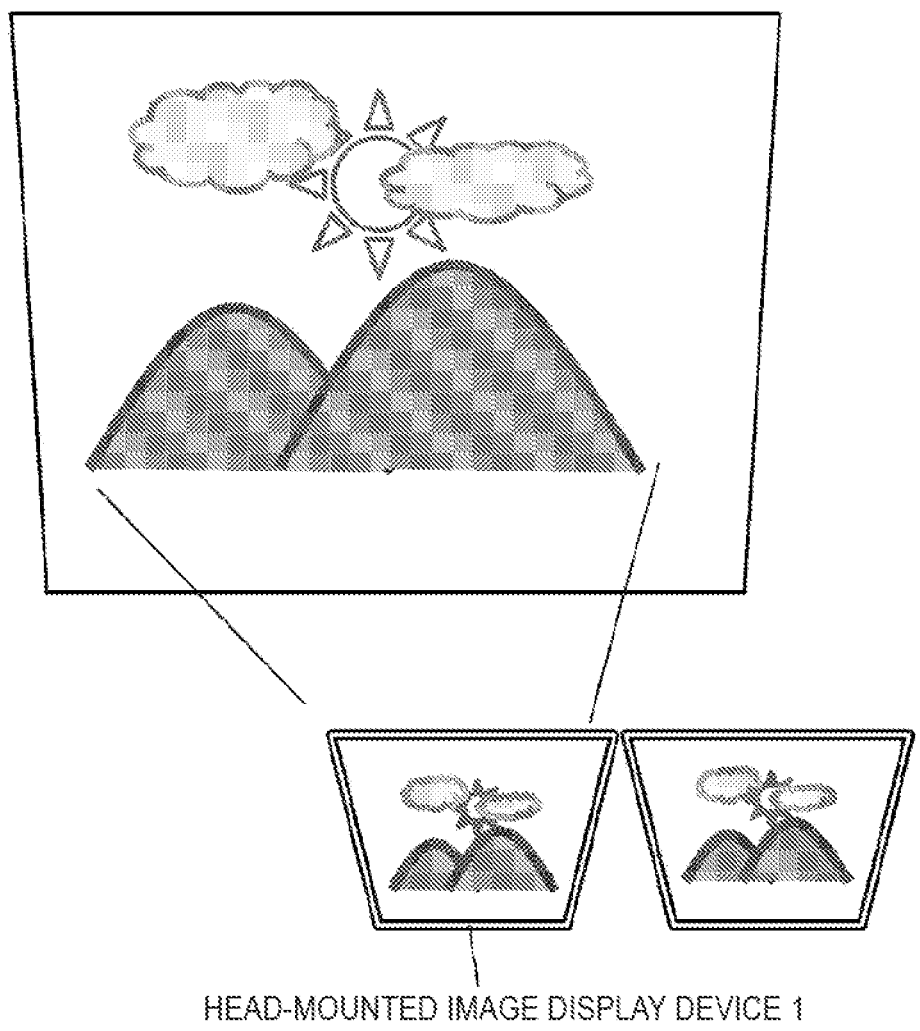
FIG. 5 is a diagram illustrating a display image of the head-mounted image display device 1 being projected onto a wall.

Note that optionally, a projection optical unit 313 may also be disposed in front of the screen onto which the real image of the external image is projected. The projection optical unit 313 enlarges and projects a real image of the external image onto a wall or the like (not illustrated) near the head-mounted image display device 1 (as above). In other words, the head-mounted image display device 1 may also be utilized as a compact projector (see FIG. 5).

Figure 6:
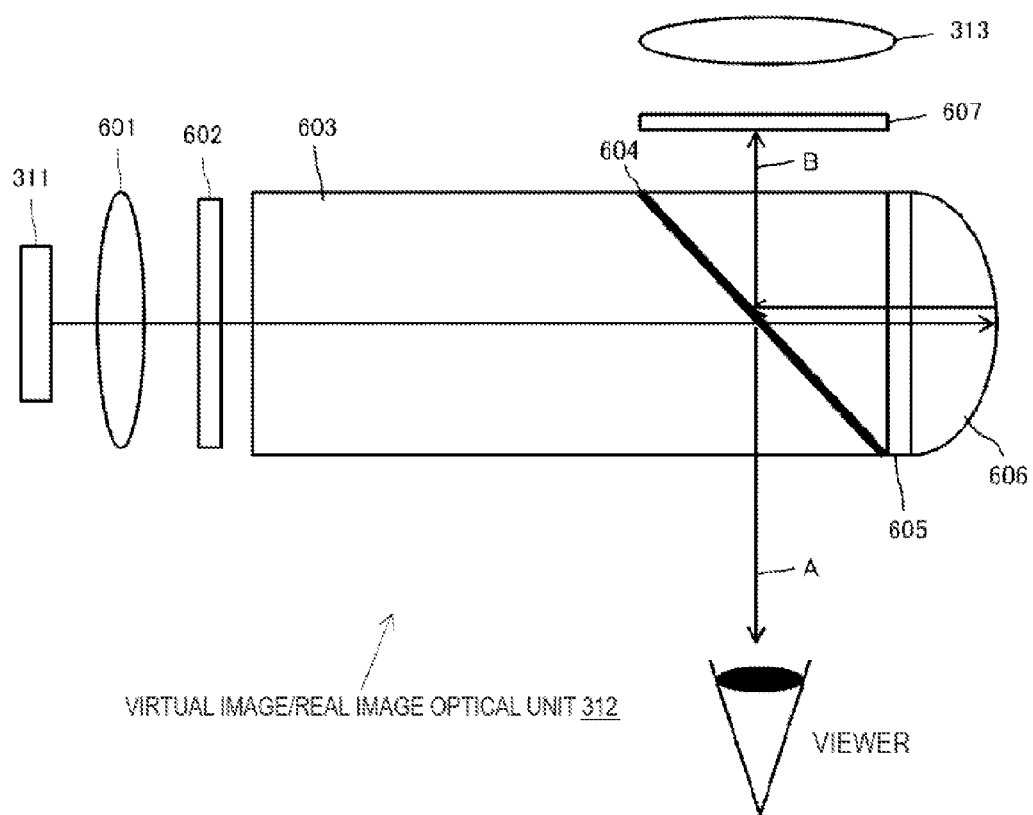
FIG. 6 is a diagram illustrating an exemplary configuration of a virtual image/real image optical unit 312.

B. Configuration of Optical System in Head-Mounted Image Display Device of Transmissive Type FIG. 6 illustrates an exemplary configuration of the virtual image/real image optical unit 312. The virtual image/real image optical unit 312 illustrated in the drawing is equipped with a collimating optical unit 601, a half-wave plate (HWP) 602, a waveguide 603, a polarization beam splitter (PBS) 604 and a quarter-wave plate 605 provided inside the waveguide 603, a concave mirror 606 formed on an edge face of the waveguide 603, and a screen 607 on which to project the external image.

The polarization beam splitter 604 is disposed with being tilted 45 degrees with respect to the optical axis of incident light from the display panel 311. Also, the quarter-wave plate 605 is disposed orthogonally to the optical axis of incident light from the display panel 311. In addition, the concave mirror 606 is formed on the edge face of the waveguide 603 on the opposite side from the incident side on which display light from the display panel 311 is incident.

Figure 7:
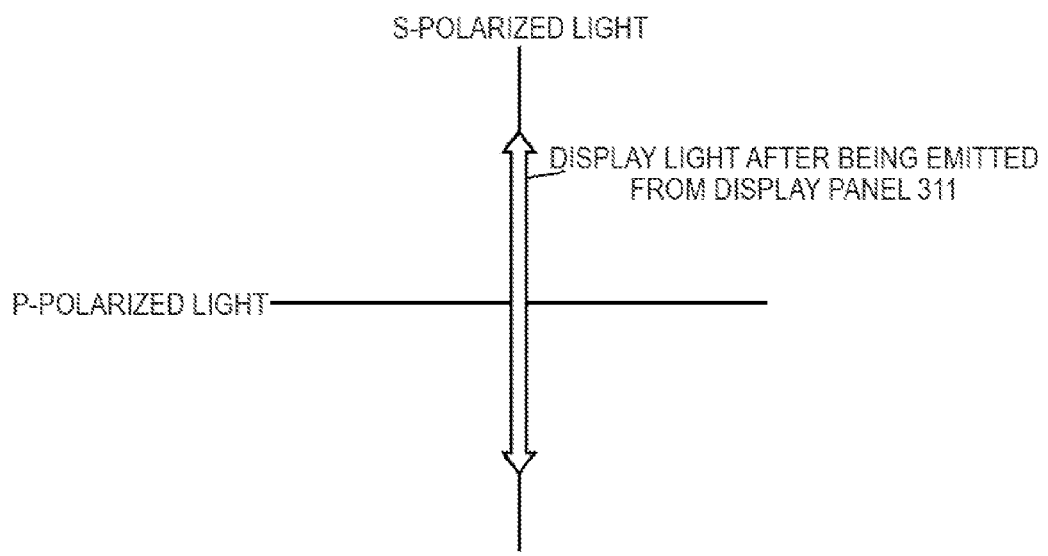
FIG. 7 is a diagram illustrating the polarization properties of display light immediately after being emitted from the display panel 311 in the virtual image/real image optical unit 312 illustrated in FIG. 6.

The collimating optical unit 601 is made up of a convex lens, for example, and is an optical unit that accepts light emitted from the pixels of the display panel 311 and works to form a group of parallel light beams. The display panel 311 is placed at a predetermined position of the focal length of the convex lens. The group of parallel light beams emitted from the collimating optical unit 601 are respectively incident on the waveguide 603 via the half-wave plate 602. The display light immediately after being emitted from the display panel 311 is made up of an s-polarized light component only (see FIG. 7).

The half-wave plate 602 is disposed between the display panel 311 and the polarization beam splitter 604. In the example illustrated in FIG. 6, display light emitted from the display panel 311 is incident on the half-wave plate 602 after becoming a group of parallel light beams via the collimating optical unit 601. The half-wave plate 602 used herein has a dynamically polarizable optical axis direction. One example of a half-wave plate 602 with a dynamically polarizable optical axis direction is an optical doubler made of ferroelectric crystal (for example, see Patent Literature 5).

Figure 8:
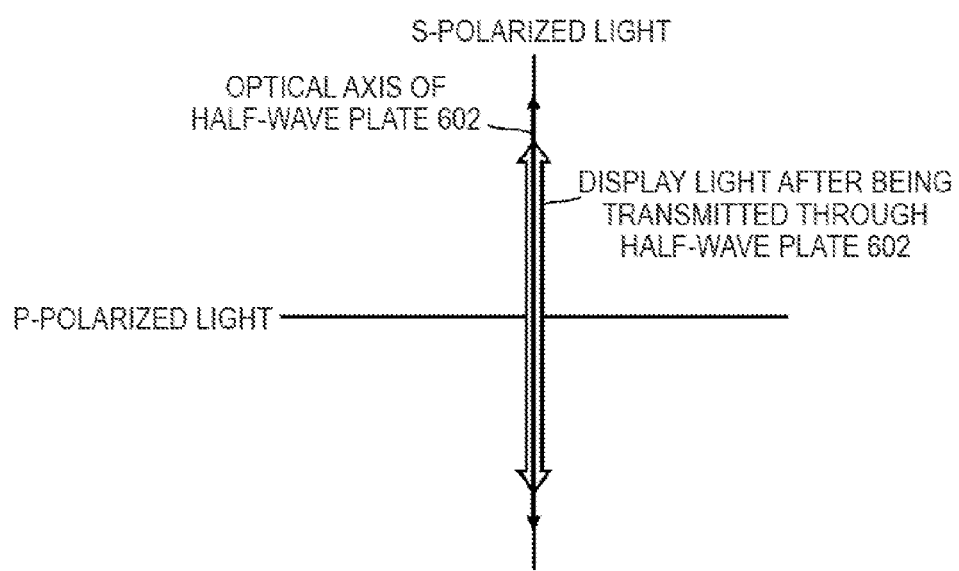
FIG. 8 is a diagram illustrating the polarization properties of display light transmitted through a half-wave plate 602 having an optical axis orientation set to 0 degrees in the virtual image/real image optical unit 312 illustrated in FIG. 6.

Herein, if the optical axis orientation of the half-wave plate 602 is set to 0 degrees, display light made of s-polarized light is transmitted through the half-wave plate 602 as-is (see FIG. 8). Also, if the optical axis orientation of the half-wave plate 602 is tilted by 45 degrees, display light converted to p-polarized light is transmitted through the half-wave plate 602 (see FIG. 9). Consequently, by changing the angle of the optical axis of the half-wave plate 602, the polarization of display light transmitted through the half-wave plate 602 may be alternated between s-polarized light and p-polarized light. In addition, by switching the period of configuring the angle of the optical axis of the half-wave plate 602, the duty of s-polarized light and p-polarized light transmitted through the half-wave plate 602 may be arbitrarily adjusted.

The waveguide 603 is made of a mostly transparent material. The group of parallel light beams made up of s-polarized light or p-polarized light after being emitted from the half-wave plate 602 is incident on the edge face on one side of the waveguide 603, undergoes total internal reflection inside the waveguide 603, and propagates in the forward direction.

The polarization beam splitter 605 is disposed on the light path of the group of parallel light beams, tilted 45 degrees with respect to the optical axis of incident light from the display panel 311. The polarization beam splitter 604 has a property of transmitting p-polarized light while reflecting s-polarized light (as is commonly known). The alternation of the group of parallel light beams between s-polarized light and p-polarized light due to changing the angle of the optical axis of the half-wave plate 602 is as discussed earlier.

When the optical axis orientation of the half-wave plate 602 is set to 0 degrees and the transmitted light is s-polarized light, light reflects off the front side of the polarization beam splitter 604 (reflected light A in FIG. 6). This reflected light A, after being emitted from the internal side face of the waveguide 603, is viewed by the viewer's pupils as an enlarged virtual image of the display image of the display panel 311. Consequently, at the timings for displaying the internal image with the display panel 311, it is sufficient to set the optical axis orientation of the half-wave plate 602 to 0 degrees.

Figure 10:
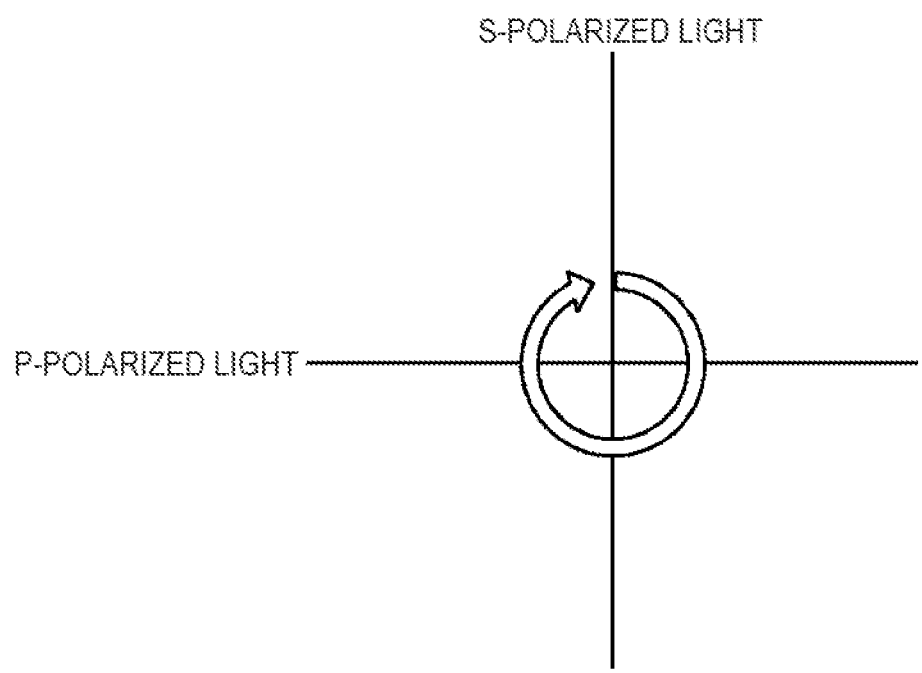
FIG. 10 is a diagram illustrating the polarization properties of display light transmitted through a polarization beam splitter 604 in the virtual image/real image optical unit 312 illustrated in FIG. 6.
Figure 11:
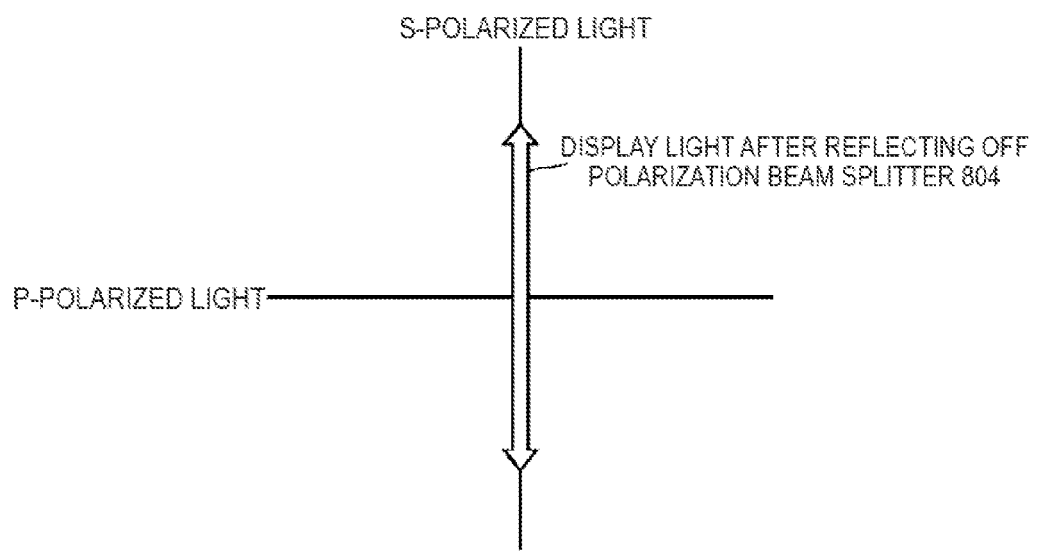
FIG. 11 is a diagram illustrating the polarization properties of display light transmitted through a polarization beam splitter 604 after being reflected and condensed by a concave mirror 606 in the virtual image/real image optical unit 312 illustrated in FIG. 6.

On the other hand, when the optical axis orientation of the half-wave plate 602 is tilted by 45 degrees and the transmitted light is p-polarized light, light is transmitted through the polarization beam splitter 604. The transmitted light is additionally converted to circularly polarized light temporarily by the downstream quarter-wave plate 605 (see FIG. 10). The circularly polarized light, after being reflected and condensed by the concave mirror 606 formed on the other edge face of the waveguide 603, is transmitted through the quarter-wave plate 605 again, and thereby converted into s-polarized light (see FIG. 11). The s-polarized light reflects off the back side of the polarization beam splitter 604 (reflected light B in FIG. 6), and travels to the side opposite the viewer's pupils, or in other words, the external side.

As illustrated in FIG. 6, on the side opposite the viewer's pupils, or in other words, on the external side, a screen 607 made of a scattering body is disposed. The s-polarized light B reflecting off the back side of the polarization beam splitter 604, after being emitted from the external side face of the waveguide 603, is projected onto the screen 607, and a real image of the display image of the display panel 311 is projected and displayed. Consequently, at the timings for displaying the external image with the display panel 311, it is sufficient to set the optical axis orientation of the half-wave plate 602 to a tilt of 45 degrees.

To ensure high luminance of the external image projected onto the screen 607, the reflectance of the polarization beam splitter 604 is raised, preferably to a reflectance of 90% or greater. In addition, the size of the screen 607 is not very large, preferably 2 in or less. Furthermore, the gain of the screen 607 is raised, preferably a gain of 2 or greater (provided that 1 is the gain during perfect diffusion, configuring a diffusion property so that the front luminance is double or more compared to a gain of 1).

For the screen 607, polymer dispersed liquid crystals (PDLCs) may be used. With PDLCs, light may be scattered by inducing an irregular state in an array of liquid crystal molecules by the action of a polymer network according to an applied voltage. Consequently, it is sufficient to produce the scattering effect of the screen 607 only when displaying the external image with the display panel 611 while also converting the display light into p-polarized light with the half-wave plate 602 and projecting the real image for display. On the other hand, when displaying the internal image with the display panel 311 while causing the display light to be transmitted directly as s-polarized light with the half-wave plate 602 to project the display light onto the viewer's pupils as an enlarged virtual image of the display panel 311, the scattering effect of the screen 607 may be inhibited, thereby taking advantage of the transmissive, or in other words, see-through property of the head-mounted image display device 1.

Alternatively, a hologram screen may be used as the screen 607. A hologram screen is a structure of an interference pattern laminated onto a resin film, and has a property of diffracting light of a specific wavelength while being transparent to light of other wavelengths. Consequently, it is sufficient to output the display image of the display panel 311 at the specific wavelength only when displaying the external image with the display panel 611 while also converting the display light into p-polarized light with the half-wave plate 602 and projecting the real image for display. On the other hand, when displaying the internal image with the display panel 311 while causing the display light to be transmitted directly as s-polarized light with the half-wave plate 602 to project the display light onto the viewer's pupils as an enlarged virtual image of the display panel 311, the display image of the display panel 311 may be output at a wavelength other than the specific wavelength, thereby preserving the transparency of the screen 607, and taking advantage of the transmissive, or in other words, see-through property of the head-mounted image display device 1.

Note that optionally, a projection optical unit 313 may also be disposed in front of the screen 607. The projection optical unit 313 enlarges and projects a real image of the external image displayed on the display panel 311 onto a wall or the like near the head-mounted image display device 1 (see FIG. 5). In other words, the head-mounted image display device 1 may also be utilized as a compact projector (as discussed earlier).

According to the exemplary configuration illustrated in FIG. 6, when the optical axis orientation of the half-wave plate 602 is set to 0 degrees, an enlarged virtual image of the display image of the display panel 311 is viewed by the viewer. On the other hand, when the optical axis orientation of the half-wave plate 602 is tilted by 45 degrees, a real image of the display image of the display panel 311 is projected onto the screen 607. Consequently, by alternating frames of the internal image and the external image with the display panel 311 in synchronization with the change in the angle of the optical axis of the half-wave plate 602, it is possible to output the internal image as an enlarged virtual image onto the viewer's pupils, while also outputting the external image as a real image onto the screen 607. In other words, it is sufficient to display the internal image with the display panel 311 in synchronization with the period in which the optical axis orientation of the half-wave plate 602 is set to 0 degrees, and also display the external image with the display panel 311 in synchronization with the period of tilting the optical axis orientation of the half-wave plate 602 by 45 degrees.

Figure 12:
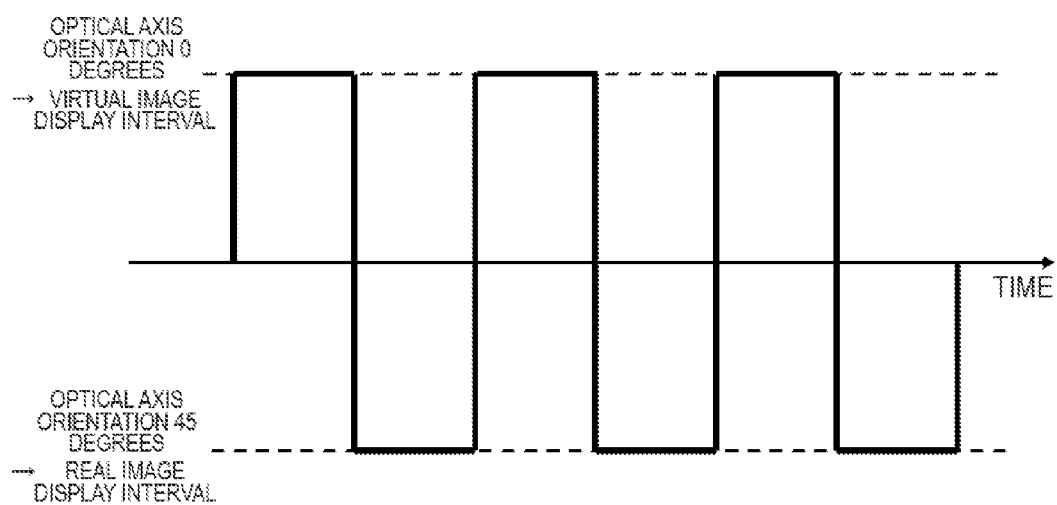
FIG. 12 is a diagram illustrating exemplary operation of the optical axis orientation of the half-wave plate 602.

FIG. 12 illustrates exemplary operation of the optical axis orientation of the half-wave plate 802. In this drawing, an interval in which the optical axis orientation of the half-wave plate 802 is set to 0 degrees alternates with an interval in which the optical axis orientation is set to 45 degrees.

The interval in which the optical axis orientation of the half-wave plate 602 is set to 0 degrees becomes a virtual image display interval in which s-polarized light emitted from the display panel 311 enters the half-wave plate 602 and an enlarged virtual image of the display image of the display panel 311 is viewed by the viewer. Consequently, it is sufficient to display the internal image with the display panel 311 in synchronization with the virtual image display interval.

The interval in which the optical axis orientation of the half-wave plate 602 is set to 45 degrees becomes a real image display interval in which p-polarized light emitted from the display panel 311 enters the half-wave plate 602 and a real image of the display image of the display panel 311 is projected onto the screen 607. Consequently, it is sufficient to display the external image with the display panel 311 in synchronization with the real image display interval.

Figure 13:
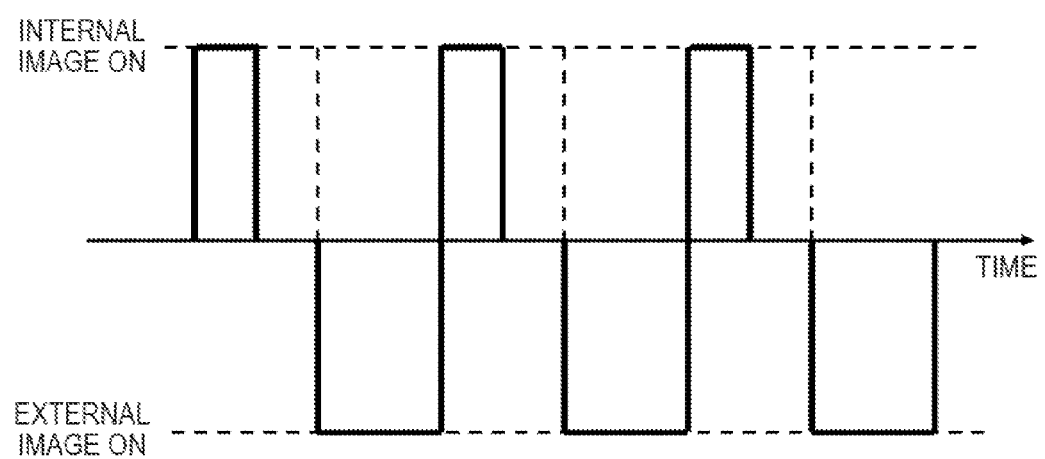
FIG. 13 is a diagram illustrating exemplary operation of the optical axis orientation of the half-wave plate 602.

Additionally, although the display panel 311 should display the internal image in the virtual image display interval in which the optical axis orientation of the half-wave plate 602 is set to 0 degrees, it is not necessary to keep the image on throughout the entire interval. FIG. 13 illustrates exemplary display operation of the display panel 311 synchronized with the operation of the optical axis orientation of the half-wave plate 602. In the example illustrated in the drawing, the display panel 311 keeps the virtual, or in other words, internal image on for only part of the virtual image display interval. The luminance of the enlarged virtual image that the viewer views may be adjusted by the ratio of the on-time of the image in the virtual image display interval. On the other hand, since the external image is a projected image projected on the screen 607 and the luminance is comparatively low, having the display panel 611 keep the image on throughout the entire real image display interval is thought to be preferable.

Figure 9:
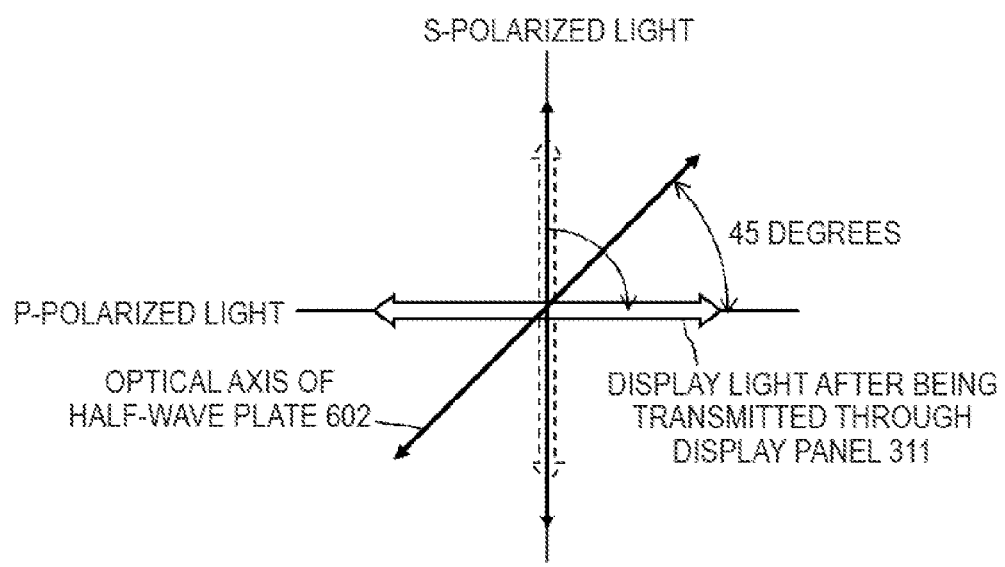
FIG. 9 is a diagram illustrating the polarization properties of display light transmitted through a half-wave plate 602 having an optical axis orientation tilted to 45 degrees in the virtual image/real image optical unit 312 illustrated in FIG. 6.
Figure 14:
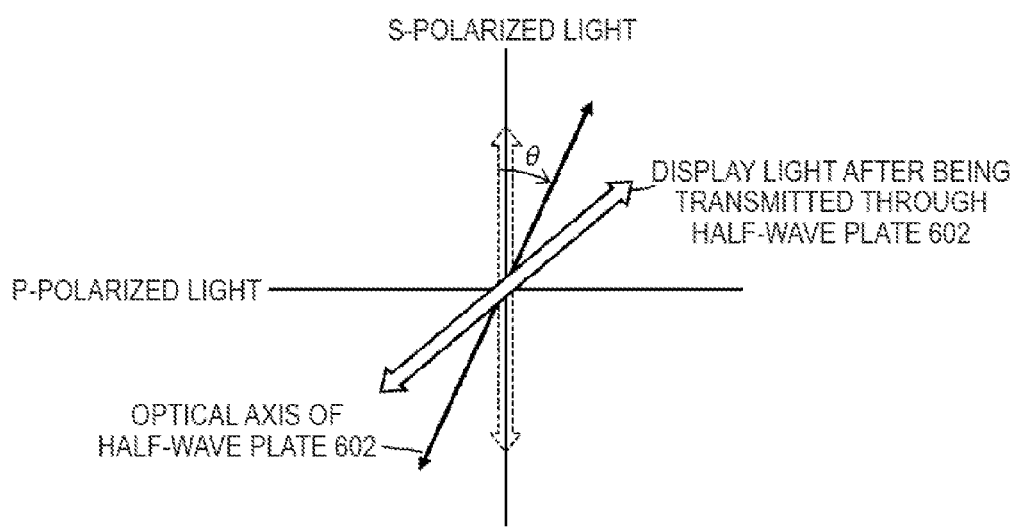
FIG. 14 is a diagram illustrating the optical axis orientation of the half-wave plate 602 set to an angle θ intermediate between 0 degrees and 45 degrees.

The foregoing has described an example of alternately displaying the internal image and the external image via time division by switching the optical axis orientation of the half-wave plate 802 between the two stages of 0 degrees and 45 degrees, as illustrated in FIGS. 8 and 9. In contrast, by setting the optical axis orientation of the half-wave plate 802 to an intermediate angle θ between 0 degrees and 45 degrees (see FIG. 14), the ratio of the s-polarized light component and the p-polarized light component of the emitted light may be adjusted. To change the optical axis orientation of the half-wave plate 802, it is sufficient to physically rotate the half-wave plate 802 itself.

Figure 15:
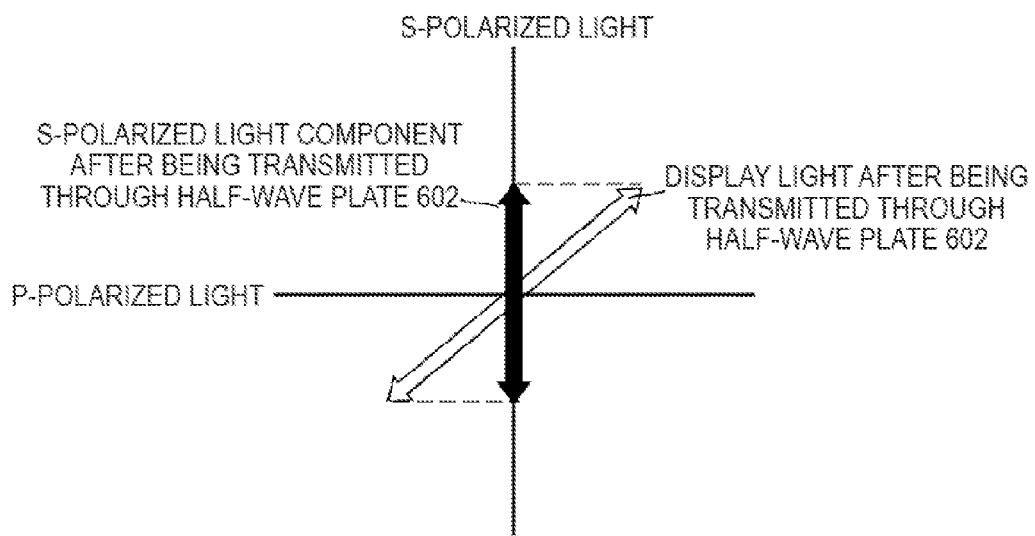
FIG. 15 is a diagram illustrating the s-polarized light component emitted when the optical axis orientation of the half-wave plate 602 is set to the angle θ.
Figure 16:
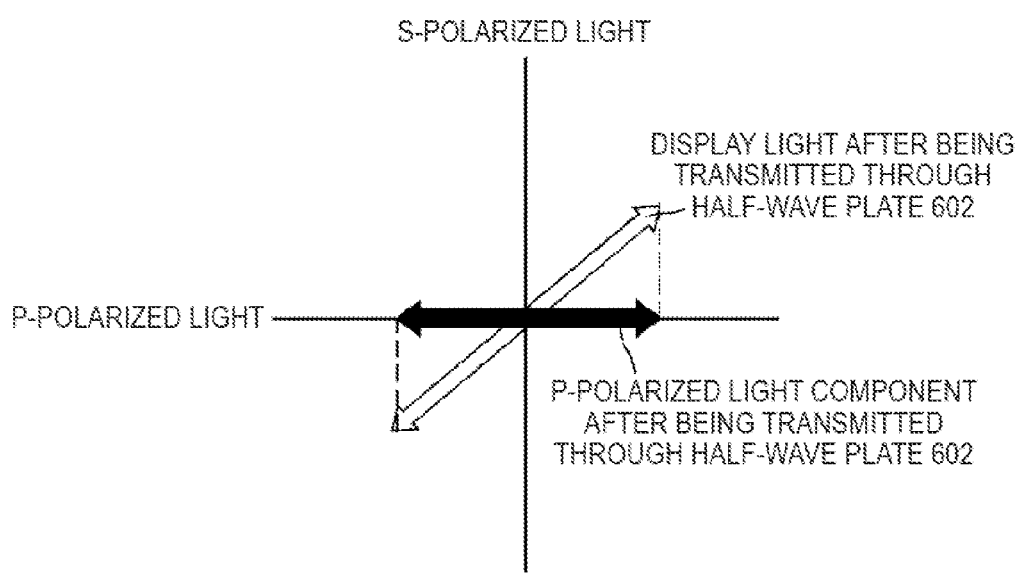
FIG. 16 is a diagram illustrating the p-polarized light component emitted when the optical axis orientation of the half-wave plate 602 is set to the angle θ.
Figure 17:
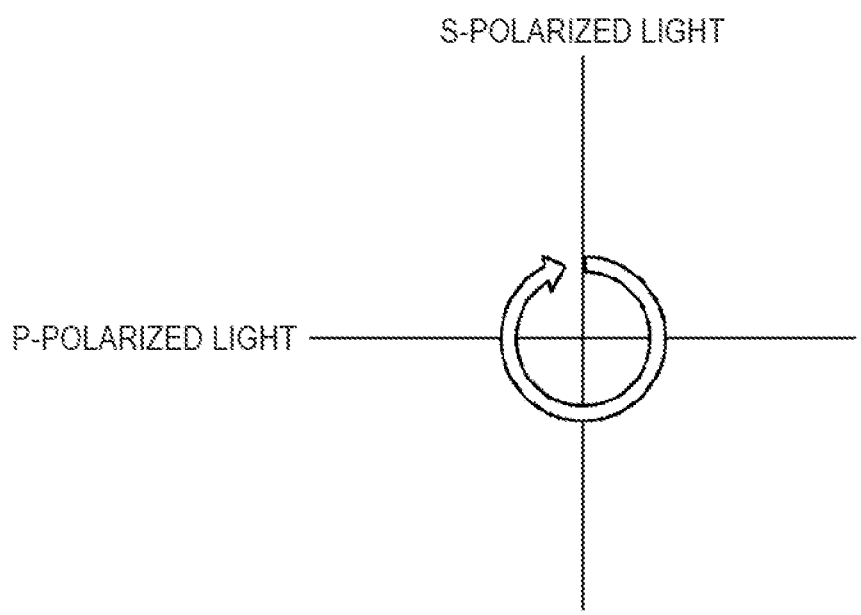
FIG. 17 is a diagram illustrating how the p-polarized light component illustrated in FIG. 16 is transmitted through a quarter-wave plate 605 and converted into circularly polarized light.
Figure 18:
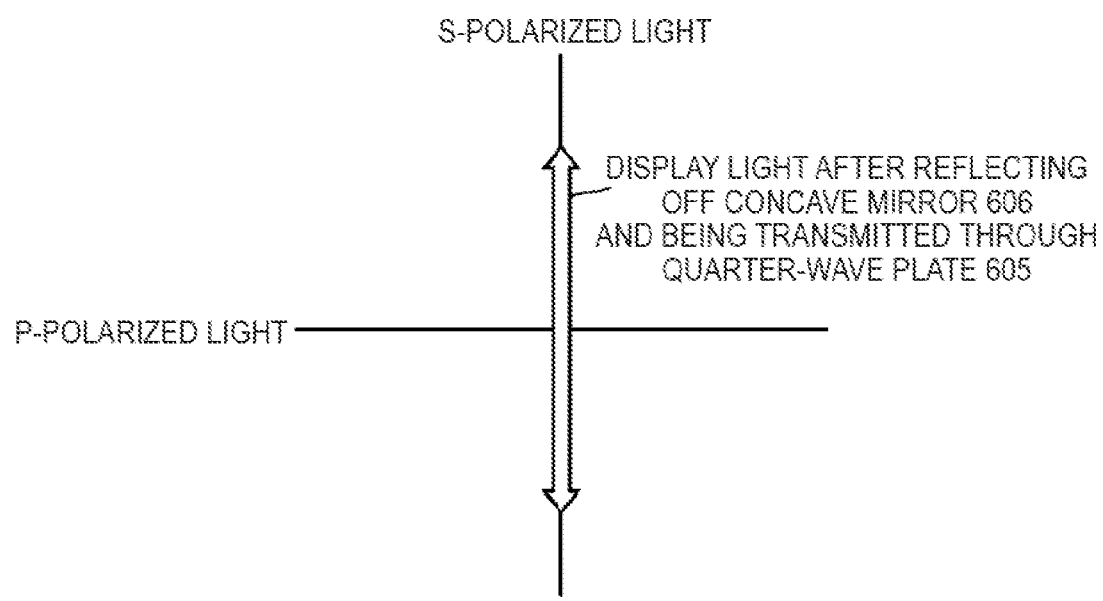
FIG. 18 is a diagram illustrating how the circularly polarized light illustrated in FIG. 17 is transmitted through the quarter-wave plate 605 and converted into s-polarized light.

The s-polarized light component after being transmitted through the half-wave plate 602 (see FIG. 15) reflects off the front side of the polarization beam splitter 604 (the reflected light A in FIG. 6), and is viewed by the viewer as an enlarged virtual image of the display image of the display panel 311. Also, the p-polarized light component after being transmitted through the half-wave plate 602 (see FIG. 16) is transmitted through the polarization beam splitter 604, and after being temporarily converted to circularly polarized light by the downstream quarter-wave plate 605 (see FIG. 17), reflects off the concave mirror 606, is transmitted through the quarter-wave plate 605 and thereby converted to s-polarized light (see FIG. 18), reflects off the back side of the polarization beam splitter 604 (the reflected light B in FIG. 6), and is projected onto the screen 607 as the external image.

For example, when setting the optical axis orientation of the half-wave plate 602 to θ, the ratio of the s-polarized light component and the p-polarized light component, or in other words, the luminance ratio of the internal image and the external image becomes $\cos^2 \theta : \sin^2 \theta$. When displaying the same external image as the internal image, the luminance of the external image may be adjusted by changing the optical axis orientation θ of the half-wave plate 602.

With the exemplary configuration of the virtual image/real image optical unit 312 illustrated in FIG. 6, the multiplexed internal image and external image are separated, and thus an external image that is different from the internal image may be presented. In contrast, if presenting an external image shared in common with the internal image, the configuration of the virtual image/real image optical unit 312 may be simplified.

Figure 19:
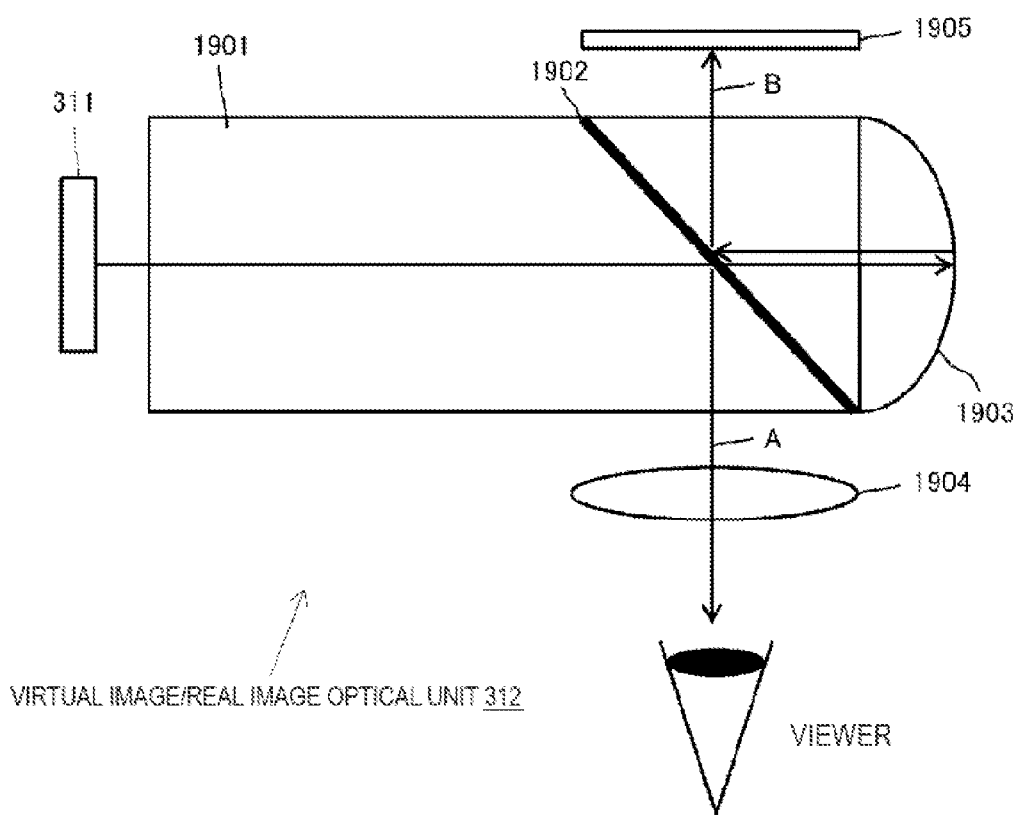
FIG. 19 is a diagram illustrating another exemplary configuration of a virtual image/real image optical unit 312.

FIG. 19 illustrates another exemplary configuration of the virtual image/real image optical unit 312. The virtual image/real image optical unit 312 illustrated in the drawing is equipped with a waveguide 1901, a half-silvered mirror 1902 disposed inside the waveguide, a concave mirror 1903 formed on an edge face of the waveguide 1901, a collimating optical unit 1904 that forms the internal image, and a screen 1905 onto which the external image is projected.

Display light emitted from the display panel 311 enters one edge face of the waveguide 1901. The half-silvered mirror 1902 is disposed with being tilted 45 degrees with respect to the optical axis of the incident light from the display panel 311, and reflects part of the incident display light while transmitting another part. The reflected light and the transmitted light are nearly equal in intensity, but may be adjusted so that the reflected light is greater in intensity, for example.

The display light reflecting off the front side of the half-silvered mirror 1902 (the reflected light A in FIG. 19), after being emitted from the internal side face of the waveguide 1901, is condensed by the collimating optical unit 1904, and viewed by the viewer's pupils as an enlarged virtual image of the display image of the display panel 311.

Meanwhile, the light transmitted through the half-silvered mirror 1902, after being reflected and condensed by the concave mirror 1903 formed on the other edge face of the waveguide 1901, reflects off the back side of the half-silvered mirror 1902 (the reflected light B in FIG. 19). The reflected light B is projected onto the screen 1905 after being emitted from the external side face of the waveguide 1901, and a real image of the display image of the display panel 311 is projected and displayed.

To ensure high luminance of the external image projected onto the screen 1905, the reflectance of the half-silvered mirror 1902 is raised, preferably to a reflectance of 90% or greater. In addition, the size of the screen 1905 is not very large, preferably 2 in or less. Furthermore, the gain of the screen 1905 is raised, preferably a gain of 2 or greater (provided that 1 is the gain during perfect diffusion, configuring a diffusion property so that the front luminance is double or more compared to a gain of 1).

Figure 20:
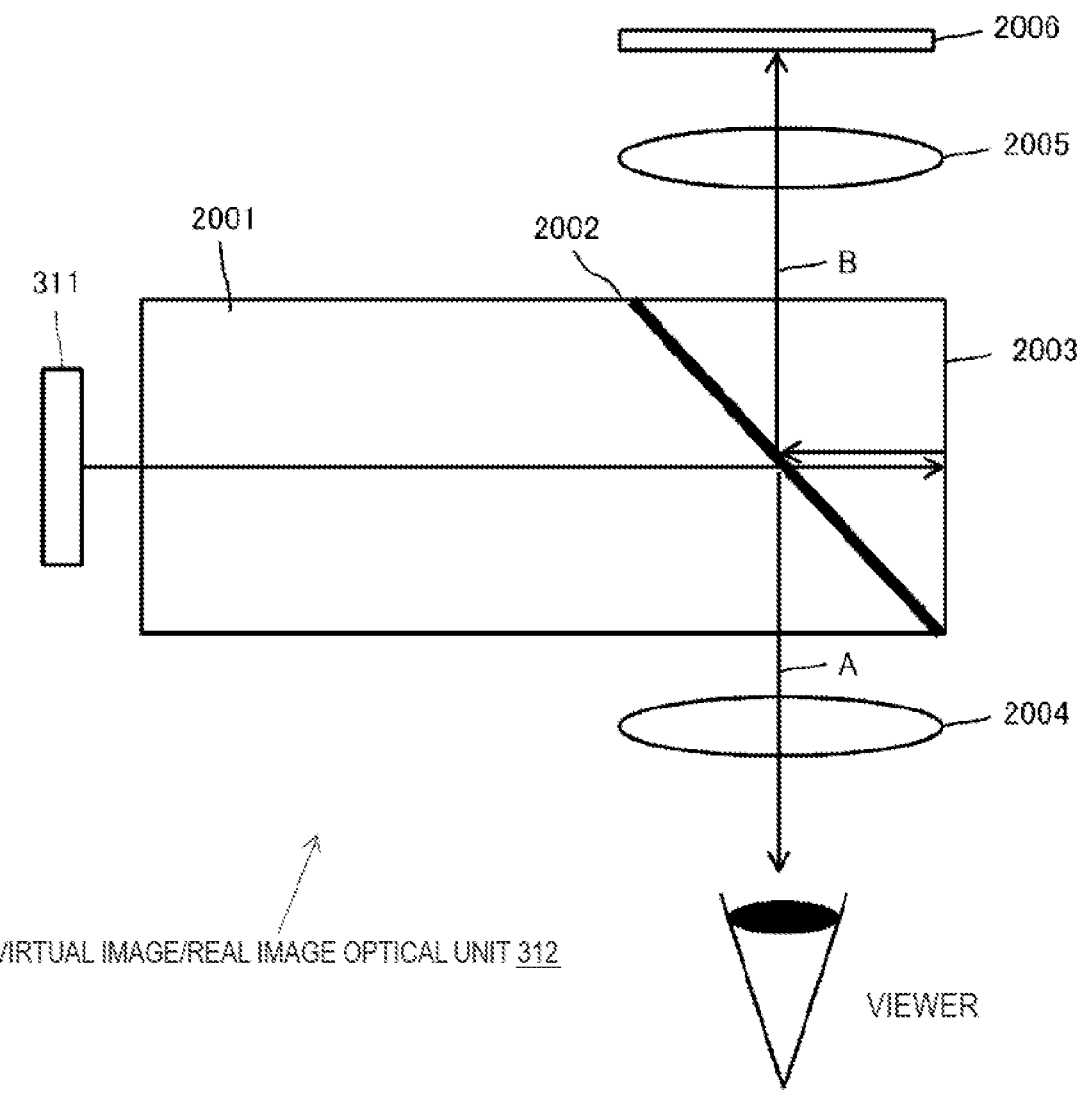
FIG. 20 is a diagram illustrating another exemplary configuration of a real image optical unit 312.

Also, FIG. 20 illustrates another exemplary configuration of the virtual image/real image optical unit 312. The virtual image/real image optical unit 312 illustrated in the drawing is equipped with a waveguide 2001, a half-silvered mirror 2202 disposed inside the waveguide 2001, a plane mirror 2003 formed on an edge face of the waveguide 2001, a collimating optical unit 2004 that forms the internal image, and a projection optical unit 2005 and a screen 2006 for projecting the external image.

Display light emitted from the display panel 311 enters one edge face of the waveguide 2001. The half-silvered mirror 2002 is disposed with being tilted 45 degrees with respect to the optical axis of the incident light from the display panel 311, and reflects part of the incident display light while transmitting another part (as above). The reflected light and the transmitted light are nearly equal in intensity, but may be adjusted so that the reflected light is greater in intensity, for example.

The display light reflecting off the front side of the half-silvered mirror 2002 (the reflected light A in FIG. 20), after being emitted from the internal side face of the waveguide 2001, is condensed by the collimating optical unit 2004, and viewed by the viewer's pupils as an enlarged virtual image of the display image of the display panel 311.

Meanwhile, the light transmitted through the half-silvered mirror 2002, after being totally reflected by the plane mirror 2003 formed on the other edge face of the waveguide 2001, additionally reflects off the back side of the half-silvered mirror 2002, and is emitted from the external side face of the waveguide 2001 (the reflected light B in FIG. 20). The reflected light B is enlarged and projected onto the screen 2006 by the projection optical unit 2005, and a projected image of the display image is displayed.

To ensure high luminance of the external image projected onto the screen 2006, it is preferable to raise the reflectance of the half-silvered mirror 2002, while also not making the size of the screen 2006 very large, and raising the gain of the screen 2006 (as above).

C. External Image Display in Head-Mounted Image Display Device

It can be argued that a head-mounted image display device is an ultimate personal display. However, since head-mounted image display devices of the related art are not equipped with means to transmit information to the outside, nearby people are unable to receive information of some kind from the wearing user. In addition, the user himor herself is unable to communicate information to the outside unless the user removes the device and interrupts the viewing of content.

In contrast, the head-mounted image display device 1 according to the present embodiment are equipped with functions for displaying an internal image seen from the side of the user wearing the relevant device, as well as an external image seen from the outside of the relevant device. Consequently, via the external image, nearby people are able to know the status of the user, what the user is doing, what the user is viewing, or the degree to which the user is concentrating on or immersed in viewing. In addition, via the external image, the user him- or herself is able to communicate information related to the user's own status or the content that the user is viewing, while still wearing the device (in other words, while continuing to view the content).

C-1. Image Control According to User Operations

As discussed earlier, the control unit 301, in response to an instruction from the user given via the input operating unit 302, controls the turning on/off of the external image, the display method (such as the size, brightness, contrast, color tint, display position, and continuous display or intermittent display of the display image), and the information to display. In addition, the control unit 301 controls an external image linked or associated with the content displayed as the internal image in response to an instruction from the user. Examples of external image and internal image display control methods according to instructions from the user are summarized in Table 1 below.

TABLE 1

Control of external/internal picture based on user operations

| Detection target | Detection method | Picture control method |
|---|---|---|
| Instruction to output external picture | Input operating unit, remote control | Internal/external picture on/off<br>External display of internal picture<br>External display of converted picture of internal picture<br>External display of status<br>Change display area, display size |
| Instruction to externally display internal picture | Input operating unit, remote control | External display of internal picture |
| Instruction to lock operations | Input operating unit, remote control | Lock operations from inside/outside |

Figure 21:
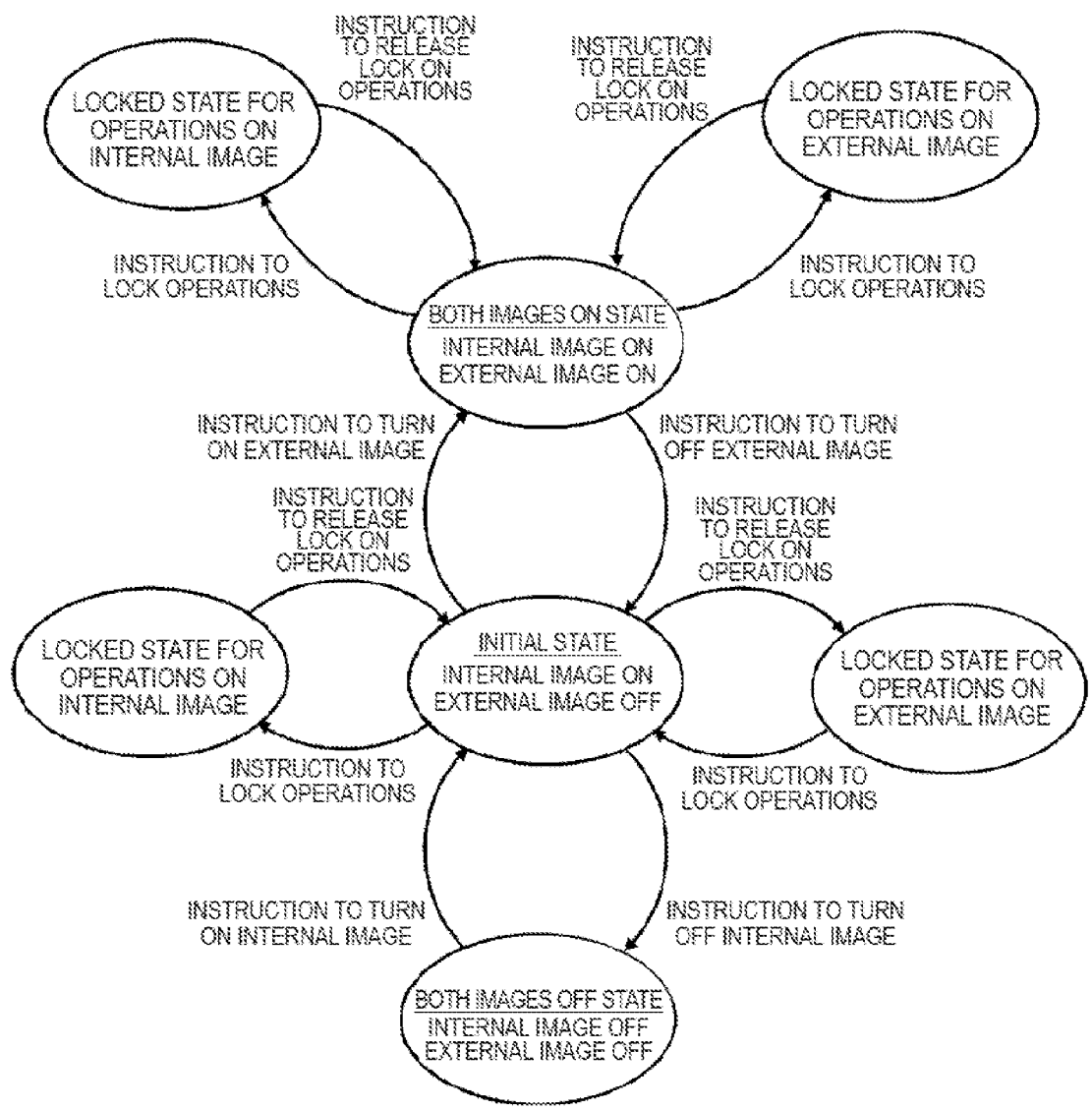
FIG. 21 is a state transition diagram illustrating exemplary operation of the head-mounted image display device 1 according to an instruction from a user via an input operating unit 302.

FIG. 21 illustrates exemplary operation of the head-mounted image display device 1 according to an instruction from a user via the input operating unit 302, in the form of a state transition diagram.

In the Initial state, the head-mounted image display device 1 turns on the internal image and turns off the external image. At this point, if an instruction to display the external image is given via the input operating unit 302, the external image is turned on, and the state transitions to the Both Images On state. Also, if an instruction to turn off the display of the external image is given while in the Both Images On state, the external image is turned off, and the state returns to the Initial state.

Note that, although omitted from illustration in FIG. 21, if an instruction to turn off the display of the internal image is given while in the Both Images On state, the internal image is turned off, and the state transitions to the Only External Image On state.

In the Both Images On state, in response to an additional instruction from the user via the input operating unit 302, control such as control to change the image displayed as the external image or the internal image, adjusting color in the external image and the internal image, controlling the brightness of the external image and the internal image, changing the display size of the external image, or moving the display area of the external image (such as full-screen display, display on only the left or right side, or display using part of the screen) is conducted.

Also, in the Initial state, if an instruction to turn off the display of the internal image is given via the input operating unit 302, the internal image is turned off, and the state transitions to the Both Images Off state. Also, if an instruction to turn on the display of the internal image is given while in the Both Images Off state, the internal image is turned on, and the state returns to the Initial state.

In the Both Images On State and the Only External Image On state in which the external image is turned on, the same image as the internal image or an external-only image that differs from the internal image is displayed (for example, when the user wants to conceal or camouflage the internal image currently being viewed from nearby people, replacement image content is displayed as the external image). Also, information about the nearby environment acquired by environmental sensors (discussed earlier) or the user's status acquired by status sensors (discussed earlier) may be displayed as the external image. Furthermore, in response to an instruction from the user given via the input operating unit 302 (including blink operations and eyeball movement detected with a myoelectric sensor or oculo-electric sensor), the information to display as the external image may be changed (like a slideshow, for example). In addition, in response to an instruction from the user given via the input operating unit 302, the external image may also be displayed internally, enabling the wearing user to visually check the external image.

In the Both Images On state and the Only External Image On state in which the external image is turned on, it is not strictly necessary to always (that is, continuously) display the external image. An intermittent display, or a timer display that displays at predetermined times may also be conducted. The control unit 301 may also cause any of a continuous display, an intermittent display, or a timer display to be conducted in response to an instruction from the user given via the input operating unit 302.

In the Initial state or the Both Images On state in which the internal image is turned on, the state transitions to a Locked state that locks user input operations on the internal image in response to an input operation that gives an instruction to lock input operations, and additionally releases the lock on user input operations on the internal image in response to an input operation that gives an instruction to release the lock. Also, in the Both-eye Images On state in which the external image is turned on, the state transitions to a Locked state that locks user input operations on the external image in response to an input operation that gives an instruction to lock input operations, and additionally releases the lock on user input operations on the external image in response to an input operation that gives an instruction to release the lock.

C-2. Image Control According to Surrounding Environment

The control unit 301 controls display operation for displaying an internal image seen from the side of the user wearing the relevant device 1 and an external image seen from the outside of the relevant device according to environmental information acquired by the environmental information acquisition unit 304. Examples of external image and internal image display control methods according to environmental information are summarized in Table 2 below.

TABLE 2

Control of external/internal picture based on external environment

| Detection target | Detection method | Picture control method |
|---|---|---|
| Environmental light intensity | Light sensor | Brightness control of external/internal picture |
| Acoustic intensity | Microphone | Secrecy level, brightness control of external picture |
| Position/location | GPS | Brightness control of external/internal picture |
| Temperature | Temperature sensor | Color control of external/internal picture |
| Weather | Camera, Internet | Brightness control of external/internal picture |
| Time | Internal clock | Intermittent display control of external picture |
| Ambient picture | Camera | External picture on/off, change display area, display size |
| Number of people | Camera | Secrecy level, brightness control of external picture |

Figure 22:
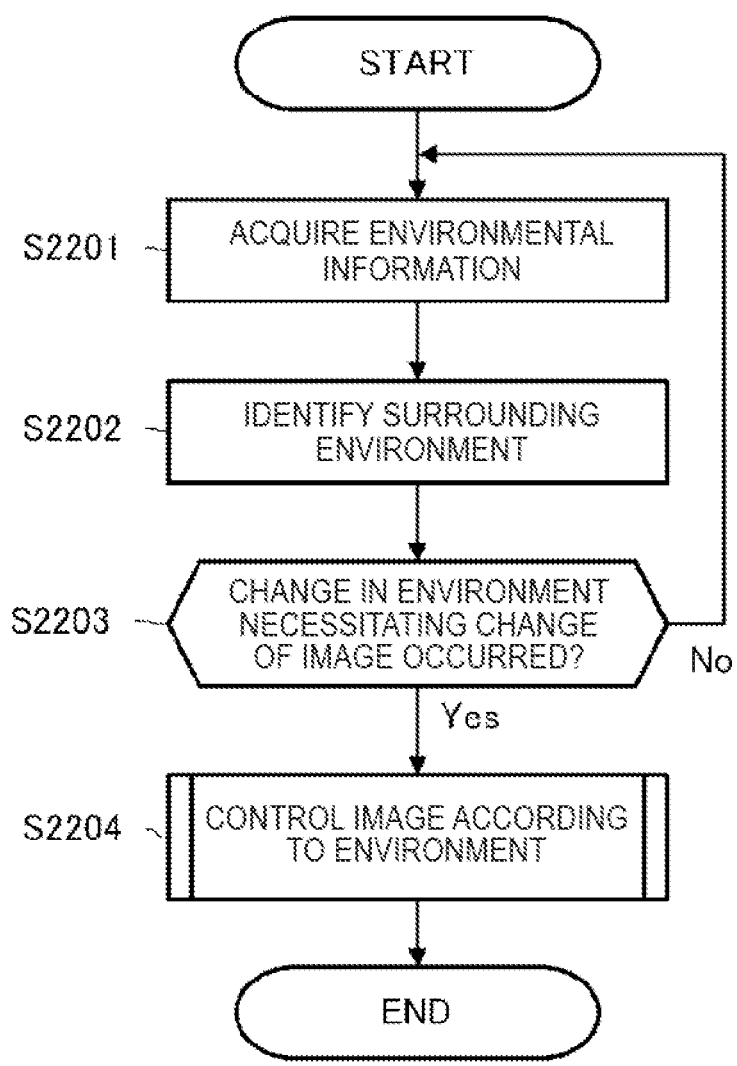
FIG. 22 is a flowchart illustrating exemplary operation of the head-mounted image display device 1 according to environmental information.

FIG. 22 illustrates exemplary operation of the head-mounted image display device 1 according to environmental information, in the form of a flowchart. The processing operations illustrated in the drawing are activated periodically, for example.

First, the environmental information acquisition unit 304 acquires output information from various environmental sensors (discussed earlier) as environmental information (step S2201). Subsequently, the control unit 301 analyzes the acquired environmental information (step S2202), identifies the surrounding environment, and checks whether or not a change in the environment necessitating a change of the internal image or the external image has occurred (step S2203).

Subsequently, when a change in the environment necessitating a change of the internal image or the external image occurs (step S2203, Yes), the control unit 301 controls the display of the external image according to the current environment (step S2204).

For example, when a change in environmental lighting is detected from the environmental information acquisition unit 304, when movement from outdoors to indoors (or from indoors to outdoors) is detected on the basis of position information or a captured image from a camera, or when it is determined to be daytime or after sunset according to the current time measured by a clock, the control unit 501 adjusts the brightness level of the external image to suit the current surrounding environment.

In addition, the control unit 301 may also conduct an intermittent display or timer display of the external image according to the current time measured by a clock.

Also, on the basis of a recognition result of a captured image from an ambient camera, the control unit 301 determines whether or not there are people near the head-mounted image display device 1, and starts the display of the external image in response to the appearance of people. Additionally, the control unit 301 controls the display area or the display size of the external image according to the location (orientation) and distance at which people appeared. The control unit 301 also controls the display area or the display size of the external image according to the number of nearby people. When there are many people, it is anticipated that the secrecy level of the image will be lowered, and thus the control unit 301 may also control the brightness level of the external image according to the number of nearby people.

C-3. Image Control According to User Status

The control unit 301 controls display operation for displaying an internal image seen from the side of the user wearing the relevant device 1 and an external image seen from the outside of the relevant device 1 according to status information about the user's current status acquired by the status information acquisition unit 305. Examples of external image and internal image display control methods according to status information are summarized in Table 3 below.

TABLE 3

Control of external/internal picture based on user status

| | Detection target | Detection method | Picture control method |
|---|---|---|---|
| Work status | Wearing/not wearing | Wear sensor | External/internal picture on/off |
| Action status | Head orientation | Gyro sensor | Change display of external picture according to head direction/rotation |
| | Still, walking, running, moving via transportation | GPS, acceleration sensor | Vibration/shake control of external/internal picture |
| | How much eyes are open | Camera | Display icon indicating how much eyes are open Change display for every blink |
| | Gaze | Camera | Display icon indicating gaze |
| Mental status | Excitement level Alertness level Feelings/emotions | Brain waves, sweat sensor | Display user status |
| Status of communication with outside | | Microphone | Display communication status |
| Gaze, eyelid open/closed status | | Camera | Display user status (gaze direction, eyelids) |
| Body temperature | | Temperature sensor | Display body temperature |

Figure 23:
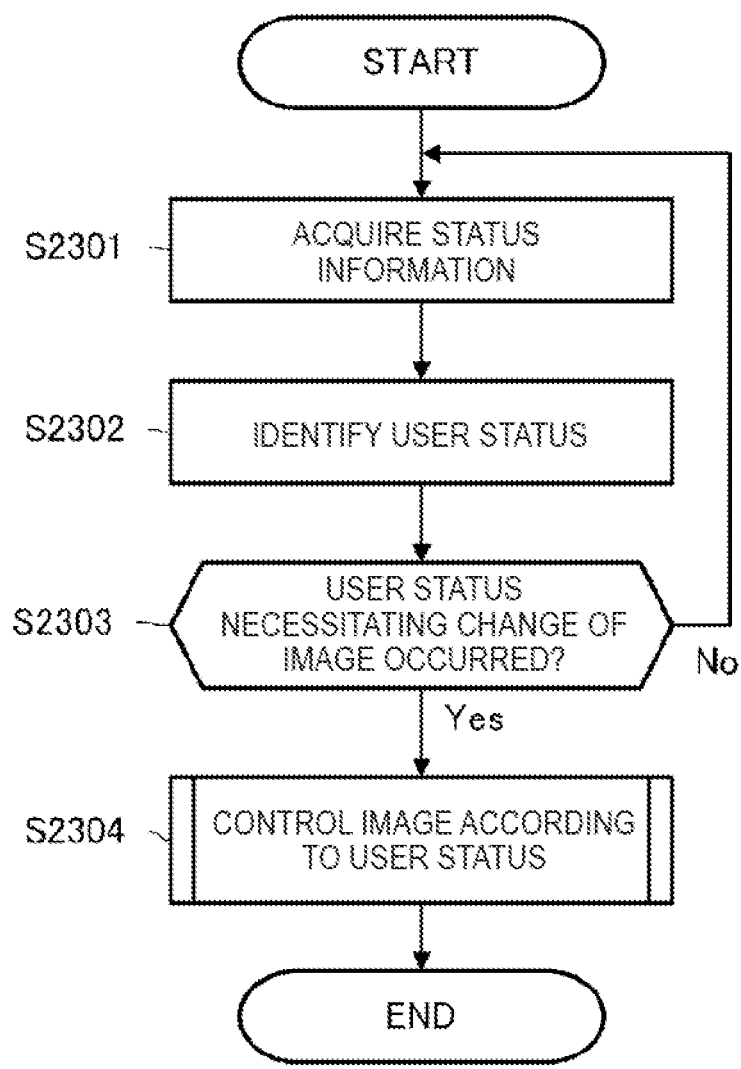
FIG. 23 is a flowchart illustrating exemplary operation of the head-mounted image display device 1 according to user status information.

FIG. 23 illustrates exemplary operation of the head-mounted image display device 1 according to user status information, in the form of a flowchart. The processing operations illustrated in the drawing are activated periodically, for example.

First, the status information acquisition unit 305 acquires output information from various status sensors (discussed earlier) as status information (step S2301). Subsequently, the control unit 301 analyzes the acquired status information (step S2302), identifies the user's current work status, action status, mental status, and physiological status, and checks whether or not a user status that should be reported to nearby people has occurred (step S2303).

Subsequently, when a user status that should be reported to nearby people occurs (step S2303, Yes), the control unit 301 controls the display of the external image according to that user status (step S2304).

Figure 24:
FIG. 24 is a diagram illustrating an example display of an icon representing a state of closed eyelids (how much the eyes are open).
Figure 25:
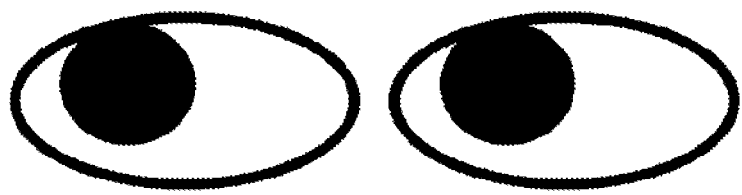
FIG. 25 is a diagram illustrating an example display of an icon representing a gaze direction (orientation of pupils).

For example, if the control unit 301 identifies the eyelid status or gaze direction on the basis of output information from a status sensor such as a myoelectric sensor, an oculo-electric sensor, or a camera, the control unit 301 displays an icon representing a state of closed eyelids (how much the eyes are open) or the gaze direction (pupil orientation) on the external image (for example, see FIGS. 24 and 25). In addition, icons like those illustrated in FIGS. 24 and 25 may also be displayed overlaid onto an external image that is the same as the internal image.

Also, if the control unit 301 identifies the user's mental status (indicating whether or not the user is immersed in or concentrating on the internal image, such as excitement level, alertness level, or feelings and emotions) on the basis of output information from status sensors, the control unit 501 displays an icon representing that mental status (not illustrated) on the external image. Furthermore, on the basis of the mental status, an acceptable condition for talking to the user, pausing the viewing of the internal image, or interrupting is determined, and an icon representing the determined condition (not illustrated), or message text such as "Currently immersed" or "Don't talk to me!", is displayed on the external image.

For example, it is known that a blink operation may be detected on the basis of output information from a status sensor such as a myoelectric sensor or an oculo-electric sensor. The control unit 301 may determine the user's mental status according to a number of blinks per unit time and a blink time. FIG. 26 illustrates an example of a method of determining the mental status (alert/drowsy/concentrating) of the user according to a number of blinks per unit time and a blink time detected with an oculo-electric technique.

Also, the control unit 301 may determine the user's mental status according to a blink interval and a blink time. FIG. 27 illustrates an example of a method of determining the mental status (alert/drowsy/concentrating) of the user according to a blink interval and a blink time detected with an oculo-electric technique.

Herein, suppose that tb is the blink time and ti is the blink interval detected with an oculo-electric technique. Also, provided that Thb is a blink time threshold, Thi is a blink interval threshold, and Mi is a blink interval maximum threshold, the average blink time A(tb) and the average blink interval A(ti) for a sampling count n are respectively calculated according to the following formulas (1) and (2).

[Math. 1]

$$A(tb)=\Sigma tb(x)/n \quad (1)$$

$$A(ti)=\Sigma ti(x)/n \quad (2)$$

Subsequently, on the basis of the average blink time A(tb) and the average blink interval A(ti) calculated according to the above formulas (1) and (2), the status is estimated according to the detection priority order indicated below.

1. Sleeping status: $A(ti)>=Mi$

2. Drowsy status: $A(tb)>Thb$

3. Concentrating status: $A(tb)<=Thb$ and $A(ti)>Thi$

4. Normal status: $A(tb)<<=Thb$ and $A(ti)<=Thi$ [Math. 2]

An image capture technique that detects a blink operation on the basis of a captured image from a camera is also known. FIG. 28 illustrates an example of a method of determining the mental status (alert/drowsy/concentrating) of the user according to a blink interval and a blink time detected with an image capture technique. With the image capture technique, on the basis of the average blink time A(tb) and the average blink interval A(ti) calculated according to the above formulas (1) and (2), the status is estimated according to the detection priority order indicated below.

1. Sleeping status: $A(ti)>=Mi$ or $A(tb)>=Mi$

2. Drowsy status: $A(tb)>Thb$

3. Concentrating status: $A(tb)<=Thb$ and $A(ti)>Thi$

4. Normal status: $A(tb)<<=Thb$ and $A(ti)<=Thi$ [Math. 3]

With blink operations, distinguishing between closed eyes and sleep is difficult in some cases. Closed eyes and sleep are both states of not looking at the screen, but differ according to whether or not the user is aware of the display content. Brain waves while the eyes are closed may be acquired from oculo-electric electrodes. During rest with the eyes closed, an alpha wave component (a frequency of approximately 10 Hz and an amplitude of several tens of microvolts) may be observed, but during sleep, alpha waves disappear from the brain waves.

On the basis of the above estimation result, whether or not the status is an acceptable status for talking to the user may be judged as follows.

TABLE 4

|  | Normal | Concentrating | Eyes closed | Sleeping |
|---|---|---|---|---|
| Acceptable to talk or not | Yes | No | Yes | Yes |
| Acceptable to pause or not | Yes | No | Yes | Yes |
| Acceptable to interrupt or not | Yes | No | Yes | No |

Also, if the control unit 301 identifies the user's action status on the basis of output information from the status sensors, the control unit 501 displays the external image to and internal image to suit that action status.

On the basis of output information from a status sensor such as a gyro sensor, an acceleration sensor, or a camera, the orientation of the user's head (or of the head-mounted image display device 1 that the user is wearing) may be detected.

When the head is detected to be tilted horizontally (the roll direction), the control unit 301 controls text information 2901 being displayed in the external image to stay horizontal (see FIG. 29).

Figure 30:
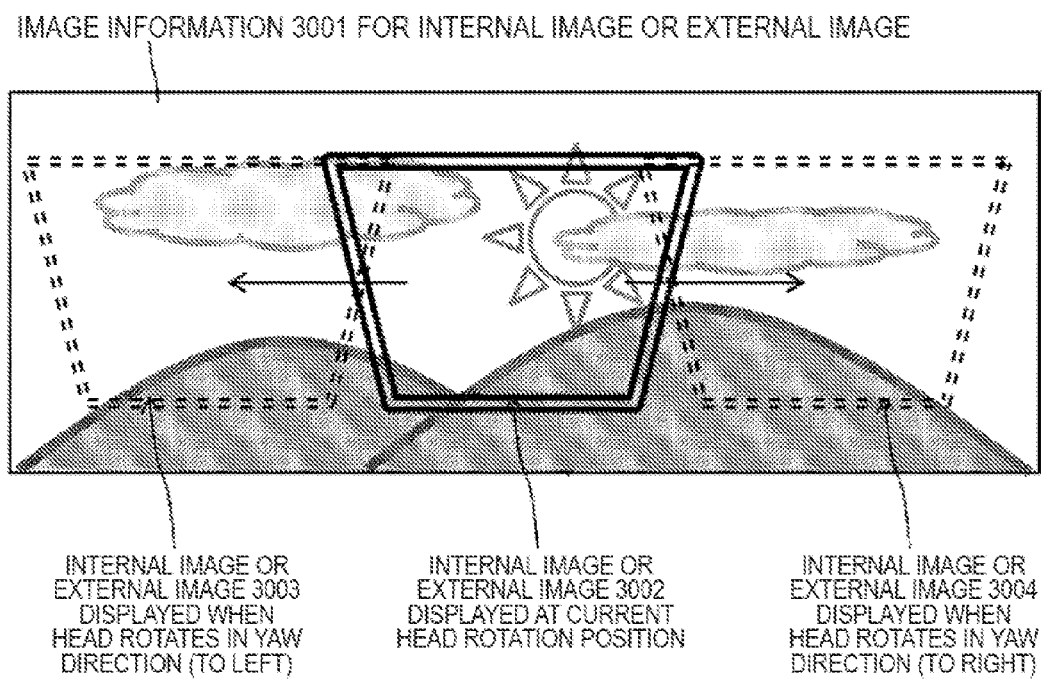
FIG. 30 is a diagram illustrating how the position of an internal image or an external image mapped to a real space is controlled to stay in place.

When the head is detected to be rotated in the (yaw direction), the control unit 301 maintains the position of an internal image or an external image mapped to a real space. For example, suppose that the image denoted by the reference number 3001 in FIG. 30 has been prepared for display of the internal image or the external image, and that for the current rotational position of the head, the area denoted by the reference number 3002 is being displayed. In such a case, if the head rotates in the yaw direction (to the left), the display moves to the display area denoted by the reference number 3003. Also, if the head rotates in the yaw direction (to the right), the display moves to the display area denoted by the reference number 3004.

Also, on the basis of output information from a status sensor such as a gyro sensor, an acceleration sensor, or a camera, an action status such as the user being still (including lying supine, sitting, and standing), walking, running, or moving via transportation may be detected. The control unit 301 controls the display of the external image to suit such an action status.

C-4. Image Control According to Display Content

The control unit 301 controls display operation for displaying an internal image seen from the side of the user wearing the relevant device 1 and an external image seen from the outside of the relevant device according to information of the content displayed as the internal image. Examples of external image and internal image display control methods according to content information are summarized in Table 5 below.

TABLE 5

Control of external/internal picture based on picture content

| Detection target | Detection method | Picture control method |
| --- | --- | --- |
| Metadata | Decoder | Display text information, QR code |
| Encoded information | Decoder | Display text information, QR code |
| Playback time, playback position | Decoder | Display playback position, remaining time |
| Content details | Content analysis, picture analysis | Convert internal picture for external display |
| Internal picture/audio | Video/acoustic analysis | Link external picture to audiovisual features |

FIG. 31 illustrates exemplary operation of the head-mounted image display device 1 according to content information, in the form of a flowchart. The processing operations illustrated in the drawing are activated periodically, for example.

First, after the content information acquisition unit 307 acquires content information (step S3101), the control unit 301 analyzes the acquired status information (step S3102).

The content information acquisition unit 307 acquires content information such as, for example, metadata accompanying image content (such as the title, genre, and detailed information about the content, and the Uniform Resource Locator (URL) of a related site), the total playback time of the image content, the current playback position or the remaining playback time, and parental controls or other usage restriction flags.

Subsequently, the control unit 301 checks whether or not content information that should be reported to nearby people has been acquired (step S3103).

At this point, when content information that should be reported to nearby people is acquired (step S3103, Yes), the control unit 501 controls display operation for displaying an internal image seen from the side of the user wearing the relevant device 1 and an external image seen from the outside of the relevant device according to content information acquired by the content information acquisition unit 507 (step S3104).

For example, according to content information, the control unit 301 controls the turning on/off of the external image, the display method (such as the size, brightness, contrast, color tint, display position, and continuous display or intermittent display of the display image), and the information to display (such as a text string such as a URL that provides detailed information or related information about the content, or a QR code (registered trademark) that encodes such a text string). In addition, the control unit 301 controls an external image linked or associated with the content displayed as the internal image according to content information.

D. Configuration Example of Technology Disclosed in Present Application

Additionally, the present technology may also be configured as below.

(1)

An image display device used by being mounted to a head or a face of a user, the image display device including:
a display device configured to display an image;
a waveguide configured to guide the image to each of a location seen from a side of the user and a location seen from an outside of the image display device; and
a control unit configured to control display of an internal image and an external image, the internal image being seen from the side of the user, the external image being seen from the outside.

(2)

The image display device according to (1),
wherein the waveguide includes a first wave plate that converts a polarization property of emitted light of the display device, a polarization beam splitter that is disposed on an optical axis of incident light of the display device and reflects or transmits the incident light in accordance with a polarization property, a second wave plate that converts and transmits a polarization property of transmitted light of the polarization beam splitter, and a mirror that reflects transmitted light of the second wave plate, and
wherein the internal image is displayed with light reflecting off the polarization beam splitter among the incident light of the display device, and the external image is displayed with the transmitted light of the polarization beam splitter, the transmitted light reflecting off the polarization beam splitter via the second wave plate and the mirror.

(3)

The image display device according to (2),
wherein the display device emits display light made of an s-polarized light component,
wherein the first wave plate includes a half-wave plate, and converts the emitted light of the display device into s-polarized light or p-polarized light,
wherein the polarization beam splitter is disposed with being tilted 45 degrees with respect to the optical axis of incident light from the display device, reflects an s-polarized light component of transmitted light of the first wave plate, displays the internal image at the location seen from the side of the user, and transmits a p-polarized light component of the transmitted light of the first wave plate, and
wherein the second wave plate includes a quarter-wave plate, the mirror includes a concave mirror, the p-polarized light component transmitted through the polarization beam splitter is transmitted through the quarter-wave plate and converted into circularly polarized light, and the p-polarized light component transmitted through the polarization beam splitter is, after being condensed and reflected by the concave mirror, transmitted through the quarter-wave plate in an inverse direction, converted into s-polarized light and reflects off the polarization beam splitter to display the external image at the location seen from the outside of the image display device.

(4)

The image display device according to (2), further including:
a collimating optical unit configured to condense the emitted light of the display device.

(5)

The image display device according to (3),
wherein an optical axis direction of the half-wave plate is dynamically polarizable, and
wherein the control unit causes the display device to keep the internal image on in synchronization with a first interval in which an optical axis orientation of the half-wave plate is set to 0 degrees, and causes the display device to keep the external image on in synchronization with a second interval in which the optical axis orientation of the half-wave plate is set to 45 degrees.

(6)

The image display device according to (5), wherein the control unit adjusts luminance of each of the internal image and the external image by changing a ratio between the first interval and the second interval.

(7)

The image display device according to (5), wherein the control unit adjusts luminance of the internal image by changing a time for which the display device keeps the internal image on in the first interval, or adjusts luminance of the external image by changing a time for which the display device keeps the external image on in the second interval.

(8)

The image display device according to (3), wherein an optical axis direction of the half-wave plate is dynamically polarizable, and wherein the control unit controls luminance of emitted light from the display device by adjusting an optical axis orientation of the half-wave plate between 0 to 45 degrees, the emitted light being displayed as the internal image and the external image.

(9)

The image display device according to (5) or (8), wherein the half-wave plate includes an optical doubler made of ferroelectric crystal.

(10)

The image display device according to (2), wherein a reflectance of the polarization beam splitter is set to a reflectance of 90% or greater.

(11)

The image display device according to (1), further including:

a screen on which the external image is projected.

(12)

The image display device according to (11), wherein the screen has a size of 2 inches or less, or the screen has a gain of two or greater.

(13)

The image display device according to (11), wherein the screen including polymer dispersed liquid crystal is used, and wherein the control unit controls a scattering effect of the screen in synchronization with a display period of the internal image or the external image.

(14)

The image display device according to (11), wherein the screen including a hologram is used, and wherein the control unit causes the display device to emit display light having a specific wavelength component when the external image is displayed, the display light being diffracted by the hologram.

(15)

The image display device according to (1), wherein the waveguide includes a half-silvered mirror that is disposed on an optical axis of incident light of the display device, a collimating optical unit that forms reflected light of the half-silvered mirror, a concave mirror that reflects transmitted light of the half-silvered mirror, and a screen on which light that further reflects off the half-silvered mirror after reflecting off the concave mirror is projected.

(16)

The image display device according to (1), wherein the waveguide includes a half-silvered mirror that is disposed on an optical axis of incident light of the display device, a collimating optical unit that forms reflected light of the half-silvered mirror, a plane mirror that reflects transmitted light of the half-silvered mirror, and a projection optical unit and a screen for projecting light that further reflects off the half-silvered mirror after reflecting off the plane mirror.

(17)

The image display device according to (1), further including:

a projection optical unit configured to project the external image to the outside.

(18)

The image display device according to (1), further including:

an input operating unit with which the user conducts an input operation, wherein the control unit controls display of the internal image and the external image in accordance with the input operation by the user.

(19)

The image display device according to (1), further including:

an environmental information acquisition unit configured to acquire information related to a surrounding environment of the image display device, wherein the control unit controls display of the internal image and the external image on the basis of the surrounding environment.

(20)

The image display device according to (1), further including:

a status information acquisition unit configured to acquire information related to a status of the user, wherein the control unit controls display of the internal image and the external image on the basis of the status of the user.

(21)

The image display device according to (1), further including:

a content information acquisition unit configured to acquire content information related to image content to be displayed as the internal image, wherein the control unit controls display of the external image in accordance with the content information.

CITATION LIST

Patent Literature

Patent Literature 1: JP 2012-141461A
Patent Literature 2: JP 2012-42654A
Patent Literature 3: JP 2000-75815A
Patent Literature 4: JP 2007-251331A
Patent Literature 5: U.S. Pat. No. 6,198,523A

INDUSTRIAL APPLICABILITY

The foregoing thus describes the technology disclosed in the present description in detail and with reference to specific embodiments. However, it is obvious that persons skilled in the art may make modifications and substitutions to these embodiments without departing from the spirit of the technology disclosed in the present description.

Although head-mounted image display devices may be categorized into opaque and transmissive types, the technology disclosed in the present description can be chiefly applied to the transmissive type.

Furthermore, although head-mounted image display devices may be categorized into a binocular type equipped with a display unit for both the left and right eyes, or a monocular type equipped with a display unit for only one of either left or right, the technology disclosed in the present description may be applied to either of these types. In addition, the head-mounted image display device obviously may also be glasses type or behind-the-ear type.

Essentially, the technology disclosed in the present description has been described by way of example, and the stated content of the present description should not be interpreted as being limiting. The spirit of the technology disclosed in the present description should be determined in consideration of the claims.

REFERENCE SIGNS LIST 1 head-mounted image display device
301 control unit
301A ROM
301B RAM
302 input operating unit
303 remote control receiving unit
304 environmental information acquisition unit
305 status information acquisition unit
306 communication unit
307 content information acquisition unit
308 image processing unit
309 image multiplexing unit
310 display driving unit
311 display panel
312 virtual image/real image optical unit
313 projection optical unit
601 collimating optical unit
602 half-wave plate
603 waveguide
604 polarization beam splitter
605 quarter-wave plate
606 concave mirror
607 screen
1901 waveguide
1902 half-silvered mirror
1903 concave mirror
1904 collimating optical unit
1905 screen
2001 waveguide
2002 half-silvered mirror
2003 plane mirror
2004 collimating optical unit
2005 projection optical unit
2006 screen

The invention claimed is:

1. An image display device, comprising:
   a display device configured to emit light to display an internal image or an external image;
   a waveguide configured to guide the light emitted from the display device to each of a first location seen from a side of a user and a second location seen from an outside of the image display device;
   an input operating unit configured to receive an input operation from the user; and
   a control unit configured to:
      control display of the internal image and the external image based on the input operation, wherein the internal image is seen from the side of the user and the external image is seen from the outside of the image display device;
      adjust luminance of the internal image by changing a first time interval for which the display device emit light to display the internal image, or adjust luminance of the external image by changing a second time interval for which the display device emit light to display the external image.

2. The image display device according to claim 1, further comprising:
   a first wave plate configured to convert a polarization property of the light emitted from the display device;
   a polarization beam splitter present on an optical axis of the display device,
   wherein the polarization beam splitter is configured to reflect or transmit the light emitted from the display device based on the polarization property of the light emitted from the display device via the first wave plate;
   a second wave plate configured to transmit and convert a polarization property of light transmitted through the polarization beam splitter; and
   a mirror configured to reflect the light transmitted through the second wave plate,
   wherein the internal image is configured to be displayed based on the light reflected off the polarization beam splitter, and the external image is configured to be displayed based on the light transmitted through the polarization beam splitter, and
   wherein the polarization beam splitter is configured to reflect the light transmitted through the polarization beam splitter and travelled via the second wave plate and the mirror.

3. The image display device according to claim 2,
   wherein the light emitted from the display device is made of a first s-polarized light component,
   wherein the first wave plate includes a half-wave plate and is further configured to convert the light emitted from the display device into s-polarized light or p-polarized light,
   wherein the polarization beam splitter is tilted 45 degrees with respect to the optical axis of the display device,
   wherein the polarization beam splitter is further configured to:
      reflect the first s-polarized light component of the light transmitted through the first wave plate to display the internal image at the first location seen from the side of the user, and
      transmit a p-polarized light component of the light transmitted through the first wave plate,
   wherein the second wave plate includes a quarter-wave plate and the mirror is a concave mirror,
   wherein the quarter-wave plate is configured such that the p-polarized light component of the light transmitted through the polarization beam splitter is transmitted through the quarter-wave plate and converted into circularly polarized light,
   wherein the concave mirror is configured to condense and reflect the p-polarized light component transmitted through the quarter-wave plate,
   wherein the quarter-wave plate is configured to convert the p-polarized light component that is reflected off the concave mirror and transmitted through the quarter-wave plate in an inverse direction into a second s-polarized light component, and
   wherein the polarization beam splitter is further configured to reflect off the second s-polarized light component to display the external image at the second location seen from the outside of the image display device.

4. The image display device according to claim 3,
wherein an optical axis direction of the half-wave plate is dynamically polarizable, and
wherein the control unit is further configured to:
  control the display device to emit light to display the internal image in synchronization with the first time interval in which an optical axis orientation of the half-wave plate is set to 0 degrees with respect to the optical axis of the display device, and
  control the display device to display the external image in synchronization with the second time interval in which the optical axis orientation of the half-wave plate is set to 45 degrees with respect to the optical axis of the display device.

5. The image display device according to claim 4,
wherein the control unit is further configured to adjust luminance of each of the internal image and the external image based on a change in a ratio between the first time interval and the second time interval.

6. The image display device according to claim 3,
wherein an optical axis direction of the half-wave plate is dynamically polarizable, and
wherein the control unit is further configured to control luminance of the light emitted from the display device based on an adjustment of an optical axis orientation of the half-wave plate between 0 to 45 degrees, and
wherein the internal image and the external image are configured to be displayed based on the light emitted from the display device.

7. The image display device according to claim 6,
wherein the half-wave plate includes an optical doubler that comprises ferroelectric crystal.

8. The image display device according to claim 4, wherein the half-wave plate includes an optical doubler, and
wherein the optical doubler comprises ferroelectric crystal.

9. The image display device according to claim 2, wherein a reflectance of the polarization beam splitter is set to a reflectance of 90% or greater.

10. The image display device according to claim 1, further comprising:
  a screen on which the external image is projected.

11. The image display device according to claim 10,
wherein the screen has a size of 2 inches or less, or the screen has a gain of two or greater.

12. The image display device according to claim 10,
wherein the screen comprises polymer dispersed liquid crystal, and
wherein the control unit is further configured to control a scattering effect of the screen in synchronization with a display period of the internal image or the external image.

13. The image display device according to claim 10,
wherein the screen comprises a hologram, and
wherein the control unit is further configured to control the display device such that, the light emitted from the display device has a specific wavelength component in the display of the external image, and wherein the light emitted is diffracted by the hologram.

14. The image display device according to claim 1, further comprising:
  a half-silvered mirror present on an optical axis of the display device,
  a collimating optical unit configured to condense the light reflected off the half-silvered mirror,
  a concave mirror configured to reflect the light transmitted through the half-silvered mirror, and
  a screen on which light that further reflects off the half-silvered mirror after reflecting off the concave mirror is projected.

15. The image display device according to claim 1, further comprising:
  a half-silvered mirror present on an optical axis of the display device,
  a collimating optical unit configured to condense the light reflected off the half-silvered mirror,
  a plane mirror configured to reflect the light transmitted through the half-silvered mirror, and
  a projection optical unit and a screen configured to project the light that further reflects off the half-silvered mirror after reflecting off the plane mirror.

16. The image display device according to claim 1, further comprising:
  a projection optical unit configured to project the external image to the second location seen from the outside of the image display device.

17. The image display device according to claim 1, further comprising:
  an environmental information acquisition unit configured to acquire information related to a surrounding environment of the image display device,
  wherein the control unit is further configured to control display of the internal image and the external image based on the information related to the surrounding environment.

18. The image display device according to claim 1, further comprising:
  a status information acquisition unit configured to acquire information related to a status of the user,
  wherein the control unit is further configured to control display of the internal image and the external image based on the information related to the status of the user.

19. The image display device according to claim 1, further comprising:
  a content information acquisition unit configured to acquire content information related to image content to be displayed as the internal image,
  wherein the control unit is further configured to control display of the external image based on the content information.

* * * * *